US012713355B2

(12) United States Patent
Lu et al.

(10) Patent No.: US 12,713,355 B2
(45) Date of Patent: Aug. 18, 2026

(54) SMART NETWORKING TECHNIQUES FOR PORTABLE PLAYBACK DEVICES

(71) Applicant: Sonos, Inc., Santa Barbara, CA (US)

(72) Inventors: Cheng Lu, Malden, MA (US); Matthew T. Pandina, Westborough, MA (US); Jason Yore, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 637 days.

(21) Appl. No.: 18/549,538

(22) PCT Filed: Aug. 25, 2021

(86) PCT No.: PCT/US2021/047559
§ 371 (c)(1),
(2) Date: Sep. 7, 2023

(87) PCT Pub. No.: WO2022/046912
PCT Pub. Date: Mar. 3, 2022

(65) Prior Publication Data

US 2024/0298265 A1 Sep. 5, 2024

Related U.S. Application Data

(60) Provisional application No. 63/157,980, filed on Mar. 8, 2021, provisional application No. 63/070,144, filed on Aug. 25, 2020.

(51) Int. Cl.
*H04W 52/02* (2009.01)
*H04W 76/19* (2018.01)

(52) U.S. Cl.
CPC ....... *H04W 52/0251* (2013.01); *H04W 76/19* (2018.02)

(58) Field of Classification Search
CPC .......................... H04W 52/0251; H04W 76/19
See application file for complete search history.

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

EP 1389853 A1 2/2004
EP 2919446 A1 9/2015
(Continued)

OTHER PUBLICATIONS

AudioTron Quick Start Guide, Version 1.0, Mar. 2001, 24 pages.
(Continued)

*Primary Examiner* — Mewale A Ambaye

(57) ABSTRACT

In one aspect, a playback device is configured to: (i) after receiving an indication that the presence of one or more first wireless networks is detected, transition from a second power state to a first power state; (ii) update, while in the first power state, a state variable from a first value indicating that a connection via at least one of one or more second wireless networks should be established to a second value indicating that a connection via at least one of the one or more first wireless networks should be established; and (iii) after updating the state variable, enter the second power state.

20 Claims, 12 Drawing Sheets

(56) References Cited

U.S. PATENT DOCUMENTS

| | | | | |
|---|---|---|---|---|
| 5,923,902 | A | 7/1999 | Inagaki | |
| 6,032,202 | A | 2/2000 | Lea et al. | |
| 6,256,554 | B1 | 7/2001 | DiLorenzo | |
| 6,404,811 | B1 | 6/2002 | Cvetko et al. | |
| 6,469,633 | B1 | 10/2002 | Wachter | |
| 6,522,886 | B1 | 2/2003 | Youngs et al. | |
| 6,611,537 | B1 | 8/2003 | Edens et al. | |
| 6,631,410 | B1 | 10/2003 | Kowalski et al. | |
| 6,757,517 | B2 | 6/2004 | Chang | |
| 6,778,869 | B2 | 8/2004 | Champion | |
| 7,130,608 | B2 | 10/2006 | Hollstrom et al. | |
| 7,130,616 | B2 | 10/2006 | Janik | |
| 7,143,939 | B2 | 12/2006 | Henzerling | |
| 7,236,773 | B2 | 6/2007 | Thomas | |
| 7,295,548 | B2 | 11/2007 | Blank et al. | |
| 7,391,791 | B2 | 6/2008 | Balassanian et al. | |
| 7,483,538 | B2 | 1/2009 | McCarty et al. | |
| 7,571,014 | B1 | 8/2009 | Lambourne et al. | |
| 7,630,501 | B2 | 12/2009 | Blank et al. | |
| 7,643,894 | B2 | 1/2010 | Braithwaite et al. | |
| 7,657,910 | B1 | 2/2010 | McAulay et al. | |
| 7,853,341 | B2 | 12/2010 | McCarty et al. | |
| 7,987,294 | B2 | 7/2011 | Bryce et al. | |
| 8,014,423 | B2 | 9/2011 | Thaler et al. | |
| 8,045,952 | B2 | 10/2011 | Qureshey et al. | |
| 8,103,009 | B2 | 1/2012 | McCarty et al. | |
| 8,234,395 | B2 | 7/2012 | Millington | |
| 8,483,853 | B1 | 7/2013 | Lambourne | |
| 8,942,252 | B2 | 1/2015 | Balassanian | |
| 2001/0042107 | A1 | 11/2001 | Palm | |
| 2002/0022453 | A1 | 2/2002 | Balog et al. | |
| 2002/0026442 | A1 | 2/2002 | Lipscomb et al. | |
| 2002/0124097 | A1 | 9/2002 | Isely et al. | |
| 2003/0157951 | A1 | 8/2003 | Hasty, Jr. | |
| 2004/0024478 | A1 | 2/2004 | Hans et al. | |
| 2007/0142944 | A1 | 6/2007 | Goldberg et al. | |
| 2007/0226351 | A1* | 9/2007 | Fischer | H04W 76/14 709/227 |
| 2008/0057930 | A1 | 3/2008 | Matsubara | |
| 2012/0149419 | A1* | 6/2012 | Roh | H04W 48/16 455/515 |
| 2013/0084844 | A1* | 4/2013 | Saito | H04W 76/15 455/418 |
| 2013/0229930 | A1* | 9/2013 | Akay | H04W 12/64 370/252 |
| 2014/0086209 | A1* | 3/2014 | Su | H04W 76/19 370/331 |
| 2015/0095680 | A1* | 4/2015 | Gossain | G06F 1/3206 713/323 |
| 2017/0266548 | A1* | 9/2017 | Perlman | A63F 13/10 |

FOREIGN PATENT DOCUMENTS

| | | | | |
|---|---|---|---|---|
| EP | 2919446 B1 * | 3/2021 | | H04W 4/80 |
| WO | 200153994 | 7/2001 | | |
| WO | 2003093950 A2 | 11/2003 | | |
| WO | 2010097054 A1 | 9/2010 | | |
| WO | 2020150595 A1 | 7/2020 | | |

OTHER PUBLICATIONS

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc SCATTERNET for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

International Bureau, International Preliminary Report on Patentability, mailed on Mar. 9, 2023, issued in connection with International Application No. PCT/US2021/047559, filed on Aug. 25, 2021, 10 pages.

International Bureau, International Search Report and Written Opinion mailed on Dec. 9, 2021, issued in connection with International Application No. PCT/US2021/047559, filed on Aug. 25, 2021, 13 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

Sonos, Inc. v. D&M Holdings (No. 14-1330-RGA), DI 219, Claim Construction Opinion (Jan. 12, 2017) (24 pages).

U.S. Appl. No. 60/490,768, filed Jul. 28, 2003, entitled "Method for synchronizing audio playback between multiple networked devices," 13 pages.

U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

Canadian Patent Office, Canadian Examination Report mailed on Aug. 29, 2024, issued in connection with Canadian Application No. 3193563, 6 pages.

PCT International Searching Authority, International Search Report and Written Opinion mailed on Dec. 9, 2021, issued in connection with International Application No. PCT/US2021/047559, 13 pages.

* cited by examiner

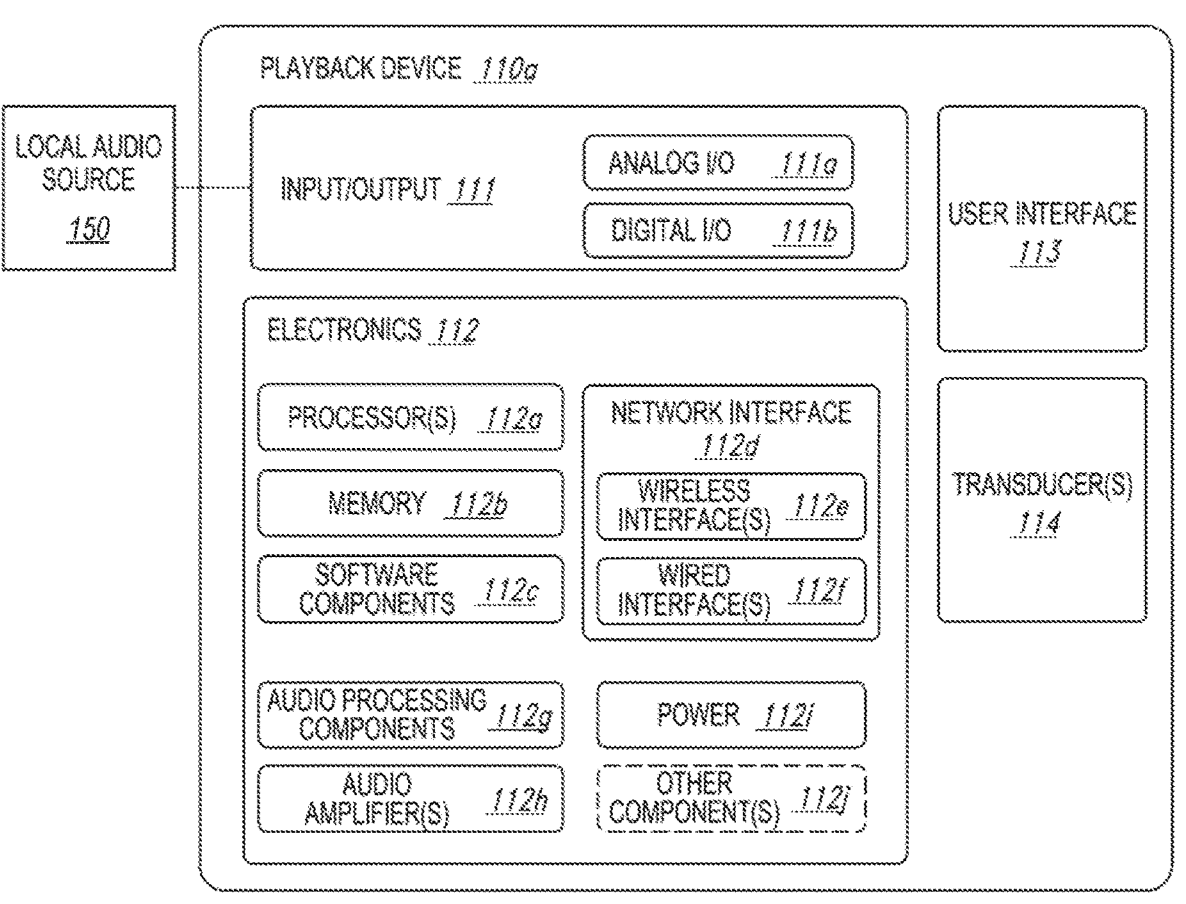
Figure 1C
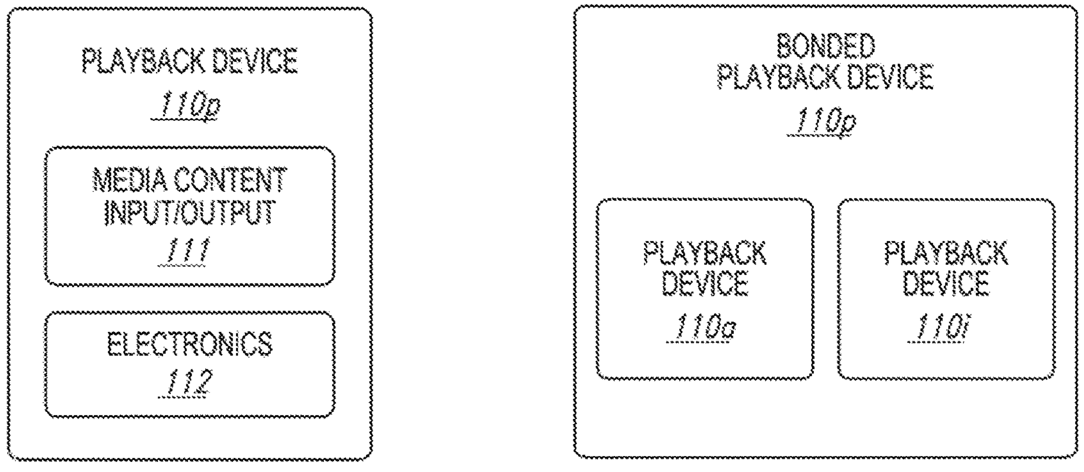
Figure 1D
Figure 1E 130a
134
133
133a
133b
133c
133d
133e
135
Cannons
Youth Lagoon - The Year of Hiberna...
Master Bedroom
ELECTRONICS 132
PROCESSOR(S) 132a
MEMORY 132b
SOFTWARE COMPONENTS 132c
NETWORK INTERFACE(S) 132d

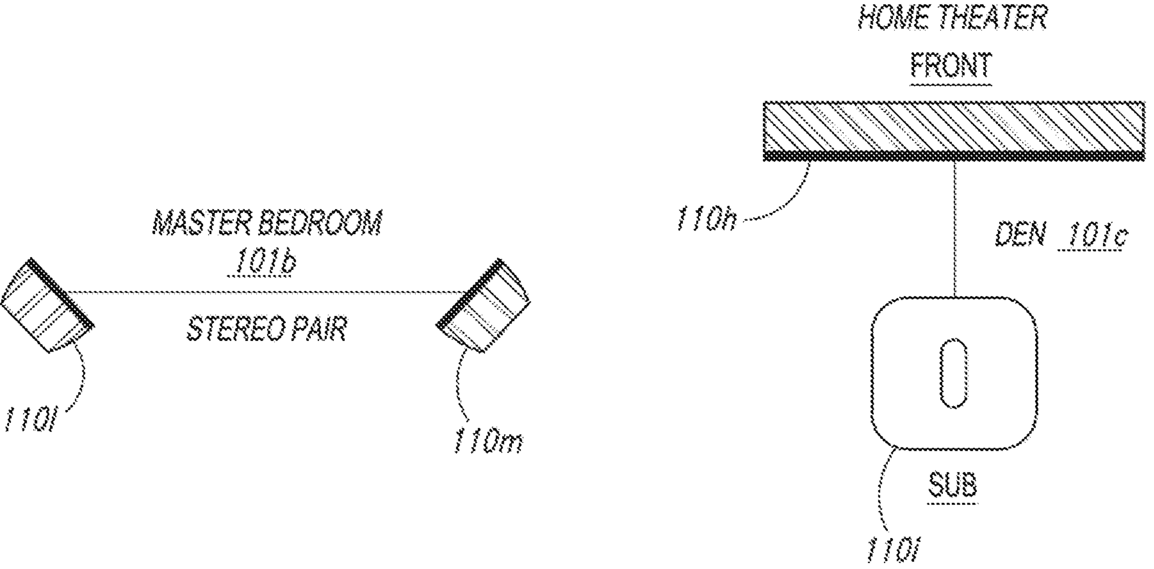
Figure 1J
Figure 1K
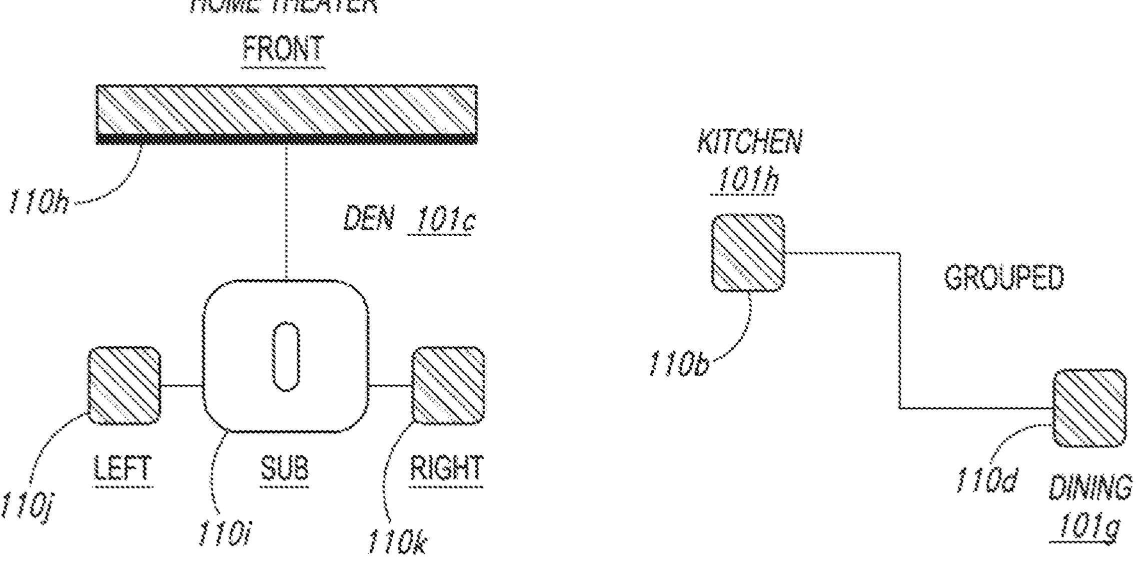
Figure 1L
Figure 1M

SMART NETWORKING TECHNIQUES FOR PORTABLE PLAYBACK DEVICES

CROSS-REFERENCE TO RELATED APPLICATIONS

This application is a national stage application under 35 U.S.C. § 371 of International Application No. PCT/US2021/047559, filed Aug. 25, 2021, which claims the benefit of priority to U.S. Provisional Patent App. No. 63/157,980, filed Mar. 8, 2021, and U.S. Provisional Patent App. No. 63/070,144, filed Aug. 25, 2020, each of which is incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

Given the ever-growing interest in digital media, there continues to be a need to develop consumer-accessible technologies to further enhance the listening experience.

BRIEF DESCRIPTION OF THE DRAWINGS

FIG. 1C is a block diagram of an example playback device.

FIG. 1D is a block diagram of an example playback device.

FIG. 1E is a block diagram of an example playback device.

FIGS. 1J through 1M are schematic diagrams of example corresponding media playback system zones.

Figure 1A:
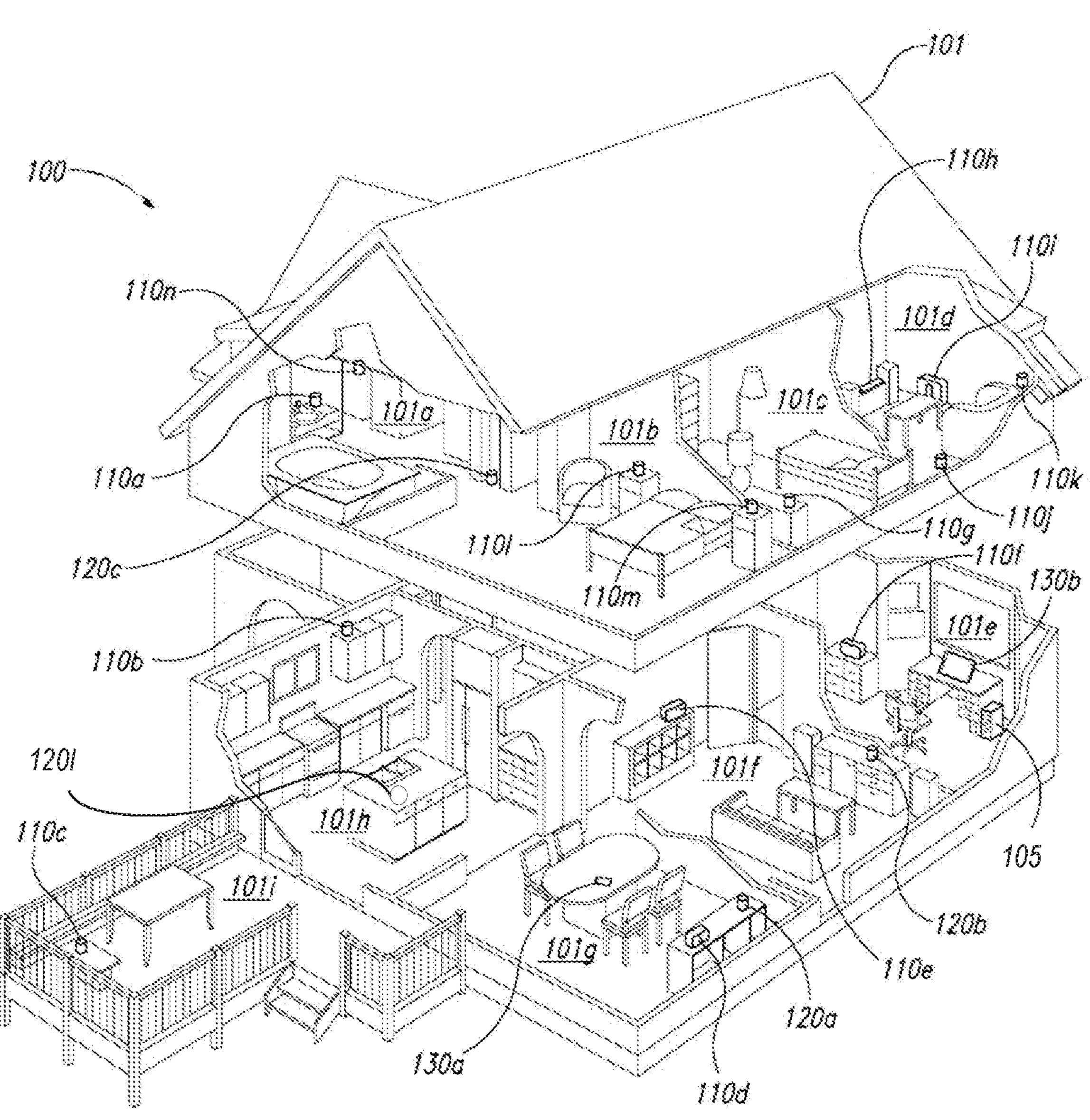
FIG. 1A is a partial cutaway view of an environment having a media playback system configured in accordance with aspects of the disclosed technology.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Consumers typically expect devices to execute a command nearly instantaneously after the command has been issued. For example, consumers expect a mobile phone to open an application within one second of activating the icon associated with the application. Further, consumers generally presume that the device is malfunctioning should the command require more than a few seconds to be executed. For example, consumers may presume that the device has frozen when an application takes longer than three seconds to open after activating the icon associated with the application. As a result, device manufacturers typically design devices to be able to execute commands nearly instantly after receipt at any time.

One challenge with conventional designs that enable the device to quickly execute commands from a user at any time is the adverse impact such designs may have on the power consumption of the device. For example, a conventional device may maintain full power to many of the electronic components (e.g., processor(s), memory, etc.) within the device regardless of whether the electronic components are sitting idle. Maintaining full power to such electronic components avoids the delay that may occur when an electronic device transitions from a sleep state to an awake state, which may be quite substantial. For example, the time for a processor to transition from a fully off state to an awake state and establish a connection with a wireless network may be approximately 10 seconds. Such a lengthy period of time to perform a simple command (e.g., connecting to a wireless network) would be intolerable to users. As a result, conventional devices typically maintain full power to many electronic components so as to provide the desired user experience.

Accordingly, SONOS, Inc. has been continually developing new technology to intelligently reduce the power consumption of a device without noticeably increasing the response time between a user issuing a command and the device executing the command. For example, SONOS, Inc.

developed new functionality for networking circuitry (e.g., a WIFI transceiver chip) that enables the networking circuitry to, on its own, scan for the presence of a network (e.g., a Service Set Identifier (SSID) associated with a known WIFI network) and output a signal when the presence of such a network is detected. Thus, a processor may be automatically woken-up from a sleep state by the networking circuitry when a network is found and, for instance, cause the processor to initiate a connection to the found network. As a result, the processor may be kept in a low-power mode until a network is detected and, once detected, cause a connection to the network to be established such that any commands received from a user that necessitate communication over the network can be processed expeditiously. Such functionality, among others, is disclosed in co-owned PCT Patent Publication No. WO/2020/150595, titled "Power Management Techniques for Waking-Up Processors in Media Playback Systems," filed Jan. 17, 2020, which is hereby incorporated by reference in its entirety.

Building upon such previous innovations, the inventors appreciated that playback devices capable of multiple different networking behaviors may present additional challenges with respect to command response time, as a playback device that is awoken from a sleep state may initially be unaware of which networking behavior it should implement. For example, a portable playback device may be capable of operating in a plurality of modes suited for various operating environments such as an At-Home Mode (e.g., for environments where a known WIFI network is likely available such as a home, workplace, hotel room, etc. associated with the user) and/or an Away-From-Home Mode (e.g., for environments where a known WIFI network is unlikely available such as in a car, on an airplane, on public transportation, on a street, etc.). A portable playback device, while operating in an At-Home Mode on the user's WIFI network, may be put to sleep to save power, as noted above. Thereafter, the user may leave their home and desire to play back music using the portable playback device via a BLUETOOTH connection in an Away Mode and may wake up the device in order to do so (e.g., by pressing a button on the device). However, the device may initially wake up from the sleep state and begin scanning for the previous WIFI network, and/or for other known WIFI networks, based on previously operating in an At-Home Mode prior to being put to sleep, which may delay the time it takes the device to pair with the user's smartphone via BLUETOOTH. Similarly, the user may return the portable playback device to the user's home in a sleep state. Upon wake-up, the portable playback device may initially attempt to re-pair with the user's smartphone, to which it was previously connected. This may delay the time it takes the portable playback device to begin its search for known WIFI networks and its eventual reconnection to the user's WIFI network.

The disclosed technology relates to further enhancing the user experience by adjusting networking behavior, independently of user input, to allow for improved transitioning between different modes of operation while maintaining the reduced power consumption techniques described above. In this regard, a device, such as a portable device, may be prepared to receive and process a user command over the appropriate wireless network when the device components (e.g., processor) are woken up after transitioning from an Away Mode to an At-Home Mode (and vice versa). Accordingly, the disclosed technology allows the device to determine preferred networking behavior prior to receiving a user command, thereby substantially reducing or eliminating the need to spend time determining the preferred networking behavior after receiving the user command. As a result, a user may perceive minimal lag in response time between issuing a command and the device executing the command after the device has transitioned to a different mode of operation.

According to embodiments disclosed herein, the network interface components of a device may be capable of communication over a BLUETOOTH network and over a WIFI network, among other possibilities. As such, the network interface may be capable of streaming music directly from a user device (e.g., a smart phone, a laptop, a tablet, etc.) over the BLUETOOTH network and also capable of streaming music from cloud servers over the WIFI network. In implementations where the device is a portable playback device (e.g., a pair of headphones, a portable speaker, etc.), transitions between these two different types of network behaviors might be a relatively common occurrence. Such transitions from away-from-home operation of the portable playback device and at-home operation of the portable playback device may be automatically detected by the network interface components described herein, even though the device is in a sleep state. Thus, the portable playback device may intelligently wake-up components (e.g., one or more processing components) to determine the appropriate networking behavior that should be used, such that a subsequent user command can be processed expeditiously (e.g., without the user having to wait for components to wake-up and/or wait for the playback device to determine the appropriate networking behavior). While the modes of operation are described above in relation to a user's home network, it should be appreciated that "home WIFI network" may encompass a device's other known WLAN networks that are not necessarily associated with the user's "home," including but not limited to the user's workplace or other frequently visited environments (e.g., a relative's home, a café, etc.).

According to the disclosed techniques, based on detecting a change in network availability, the device may, prior to putting to sleep electronic components that are used only for specific commands, update a flag state identifying the mode of operation (e.g., At-Home or Away) in which the device should operate upon waking up those components. Accordingly, while in the At-Home Mode, should the device lose a connection to a known WIFI network, the device may update the flag state (e.g. update the flag state to Away)—thereby informing the processing and networking components that they should attempt to establish a connection to a BLUETOOTH network (e.g., enter a BLUETOOTH pairing mode) upon waking up—and put the processing components to sleep to reduce power consumption. As a result, not only may the power consumption of the device be substantially reduced, but also the device's lag time in responding to a user command after waking up may be substantially reduced because the device will know that it should connect to a BLUETOOTH network instead of first attempting to re-establish the lost connection to the WIFI network, and/or determining which network to connect to after receiving the user command. Conversely, while in the Away Mode, should the device detect that a connection to a known WIFI network is available, the device may update the flag state (e.g., At-Home) indicating that the networking components should attempt to establish a connection to the known WIFI network upon waking up.

The disclosed techniques described herein may be readily applied to any of a variety of devices. For example, the disclosed techniques may be applied to a playback device that is configured to play back audio content. The playback device may comprise one or more processing components that cause the playback device to perform various operations. The one or more processing components may include a processor (e.g., a general purpose processor (GPP) such as an application processor) that has a plurality of power states including an awake state and one or more sleep states such as a light sleep state and/or a deep sleep state. In awake states, the processor may be capable of executing instructions, power may be maintained to the processor caches (e.g., L1, L2, and/or L3 caches), and the clocks may be on (e.g., core clock, bus clock, etc.). In light sleep states, the power consumption may be reduced relative to the awake states by reducing a frequency of and/or turning off one or more clocks while maintaining power to the processor caches. Thus, light sleep states may offer some power consumption reduction relative to awake states while still being able to transition to awake states expeditiously. In deep sleep states, the power consumption may be reduced relative to the light sleep states by both turning off one or more clocks and powering down one or more processor caches. Deep sleep states may include those states where the processor is entirely powered off. Thus, deep sleep states may offer an additional power consumption reduction relative to light sleep states and require additional time to transition to awake states relative to light sleep states.

The playback device may further include various electronic components coupled to the one or more processing components to facilitate play back of audio content. For example, the playback device may comprise one or more amplifiers that are configured to drive one or more speakers. In some embodiments, the one or more speakers may be external to the playback device. For example, the one or more speakers may be cabinet speakers that are coupled to the playback device using speaker wire or other wired or wireless connectors. In other embodiments, the one or more speakers may be integrated with the playback device. For example, the playback device may be implemented as a wireless speaker.

The playback device may further include one or more network interface components that are coupled to the one or more processing components to facilitate communication over a wireless network using one or more communication protocols. For example, the network interface components may be capable of wirelessly communicating with a first computing device over a first wireless network (e.g., cellular network and/or a wireless local area network (WLAN)) and wirelessly communicating with a second computing device over a second wireless network (e.g., a personal area network (PAN) such as BLUETOOTH classic or BLUETOOTH Low Energy (BLE)). The network interface components may comprise one or more network circuits configured to determine whether a wireless network is within range and provide an output signal to the one or more processing components when the wireless network is within range. The network circuits may determine whether the wireless network is within range by, for example, broadcasting probe requests for wireless networks and analyzing the received response messages. Should a response message originate from a known wireless network and have a signal strength that is sufficiently high to establish a stable connection, the network circuit may determine that the wireless network is within range and provide the output signal. Otherwise, the network circuit may determine that the wireless network is not within range and continue sending probe requests.

The output signal from the network circuit may trigger the one or more processing components to perform any of a variety of operations. For example, the output signal may indicate that a known wireless network is in range and the user is likely to issue a command to stream music over the wireless network. Thus, the one or more processing components may ready the components responsible for handling streaming music in anticipation of receiving such a command. Accordingly, the one or more processing components may transition the processor from a sleep state to an awake state and update the flag state to indicate a mode of operation (e.g., At-Home Mode). Once the processor is in the awake state, the processor may be employed to communicate over the wireless network with a computing device. For example, if the flag state indicates the device should operate in an At-Home Mode, the processor may communicate over the wireless network with a network router to obtain network configuration information (e.g., an Internet Protocol (IP) address of the network router, keys used to encrypt and/or decrypt messages, etc.) that may be employed for subsequent communication over the wireless network. Such network configuration information may be stored for subsequent retrieval to advantageously reduce the time required to initiate communication over the wireless network. Additionally, the processor may communicate with a server over the Internet to obtain registration information (e.g., security tokens) that may be employed for subsequent communication with one or more cloud servers (e.g., cloud servers accessed to obtain an audio stream). Similarly, such registration information may be stored for subsequent retrieval to, for example, advantageously reduce the time required to access an audio stream for playback. Still yet further, the processor may communicate with another playback device on the same network (e.g., another playback device on the same LAN) to obtain player state information regarding other nearby playback devices, such as what song was last played by the other playback devices. Such player state information may be stored for subsequent retrieval to, for example, advantageously reduce the time required to continue playback of the last song played on another playback device.

After the one or more processing components have woken-up the processor and communicated over the wireless network, the one or more processing components may put the processor back to sleep in order to conserve power. Thereafter, the one or more processing components may receive a command to start streaming music from an audio source over the wireless network. Once the one or more processing components receive the command to start streaming music, the one or more processing components may again wake up the processor in order to obtain the audio content. As noted above, waking the processor from the sleep state may be substantially streamlined, as the playback device may read the flag state and immediately begin operating in the At-Home Mode to obtain the audio content by, for example, retrieving the stored network configuration information and registration information from memory, communicating over the wireless network using the network configuration information, and communicating with one or more cloud servers using the registration information to obtain the audio content. Once the audio content has been obtained, the one or more processing components may initiate playback of the audio content via the one or more amplifiers and the one or more speakers.

In one aspect, a playback device is provided including at least one communication interface configured to facilitate communication over a plurality of wireless networks, at least one processor, at least one non-transitory computer-readable medium, and program instructions stored on the at least one non-transitory computer-readable medium that are executable by the at least one processor such that the playback device is configured to (i) operate in a first mode of operation in which the playback device is configured to, (1) while the playback device is in a first power state and connected to at least one first wireless network, play back first audio content received via the at least one first wireless network from a user device, and (2) transition from the first power state to a second power state where the playback device consumes less power than in the first power state, (ii) while operating in the first mode of operation and in the second power state, detect that a connection to at least one second wireless network is available, (iii) based on detecting that the connection to the at least one second wireless network is available, (1) transition from the second power state to the first power state; (2) establish a connection to one of the at least one second wireless network; (3) update at least one state variable indicative of a selected mode of operation; and (4) after establishing the connection to the one of the at least one second wireless network, transition from the first power state to the second power state, (iv) after updating the at least one state variable and while the playback device is in the second power state, detect a triggering event indicative of a user input, and (v) based on the triggering event and the updated at least one state variable, (1) transition from the second power state to the first power state and (2) begin to operate in the second mode of operation in which the playback device is configured to, while the playback device is in the first power state and connected to the one of the at least one second wireless network, play back second audio content received via the one of the at least one second network from at least one remote server.

In another aspect, a non-transitory computer-readable medium is provided. The non-transitory computer-readable medium is provisioned with program instructions that, when executed by at least one processor, cause a playback device to (i) operate in a first mode of operation in which the playback device is configured to, (1) while the playback device is in a first power state and connected to at least one first wireless network, play back first audio content received via the at least one first wireless network from a user device, and (2) transition from the first power state to a second power state where the playback device consumes less power than in the first power state, (ii) while operating in the first mode of operation and in the second power state, detect that a connection to at least one second wireless network is available, (iii) based on detecting that the connection to the at least one second wireless network is available, (1) transition from the second power state to the first power state; (2) establish a connection to one of the at least one second wireless network; (3) update at least one state variable indicative of a selected mode of operation; and (4) after establishing the connection to the one of the at least one second wireless network, transition from the first power state to the second power state, (iv) after updating the at least one state variable and while the playback device is in the second power state, detect a triggering event indicative of a user input, and (v) based on the triggering event and the updated at least one state variable, (1) transition from the second power state to the first power state and (2) begin to operate in the second mode of operation in which the playback device is configured to, while the playback device is in the first power state and connected to the one of the at least one second wireless network, play back second audio content received via the one of the at least one second network from at least one remote server.

In yet another aspect, a method carried out by a playback device includes (i) operating in a first mode of operation in which the playback device is configured to, (1) while the playback device is in a first power state and connected to at least one first wireless network, play back first audio content received via the at least one first wireless network from a user device, and (2) transition from the first power state to a second power state where the playback device consumes less power than in the first power state, (ii) while operating in the first mode of operation and in the second power state, detecting that a connection to at least one second wireless network is available, (iii) based on detecting that the connection to the at least one second wireless network is available, (1) transitioning from the second power state to the first power state; (2) establishing a connection to one of the at least one second wireless network; (3) updating at least one state variable indicative of a selected mode of operation; and (4) after establishing the connection to the one of the at least one second wireless network, transitioning from the first power state to the second power state, (iv) after updating the at least one state variable and while the playback device is in the second power state, detecting a triggering event indicative of a user input, and (v) based on the triggering event and the updated at least one state variable, (1) transitioning from the second power state to the first power state and (2) beginning to operate in the second mode of operation in which the playback device is configured to, while the playback device is in the first power state and connected to the one of the at least one second wireless network, play back second audio content received via the one of the at least one second network from at least one remote server.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

II. Suitable Operating Environment a. Suitable Media Playback System

Figure 1B:
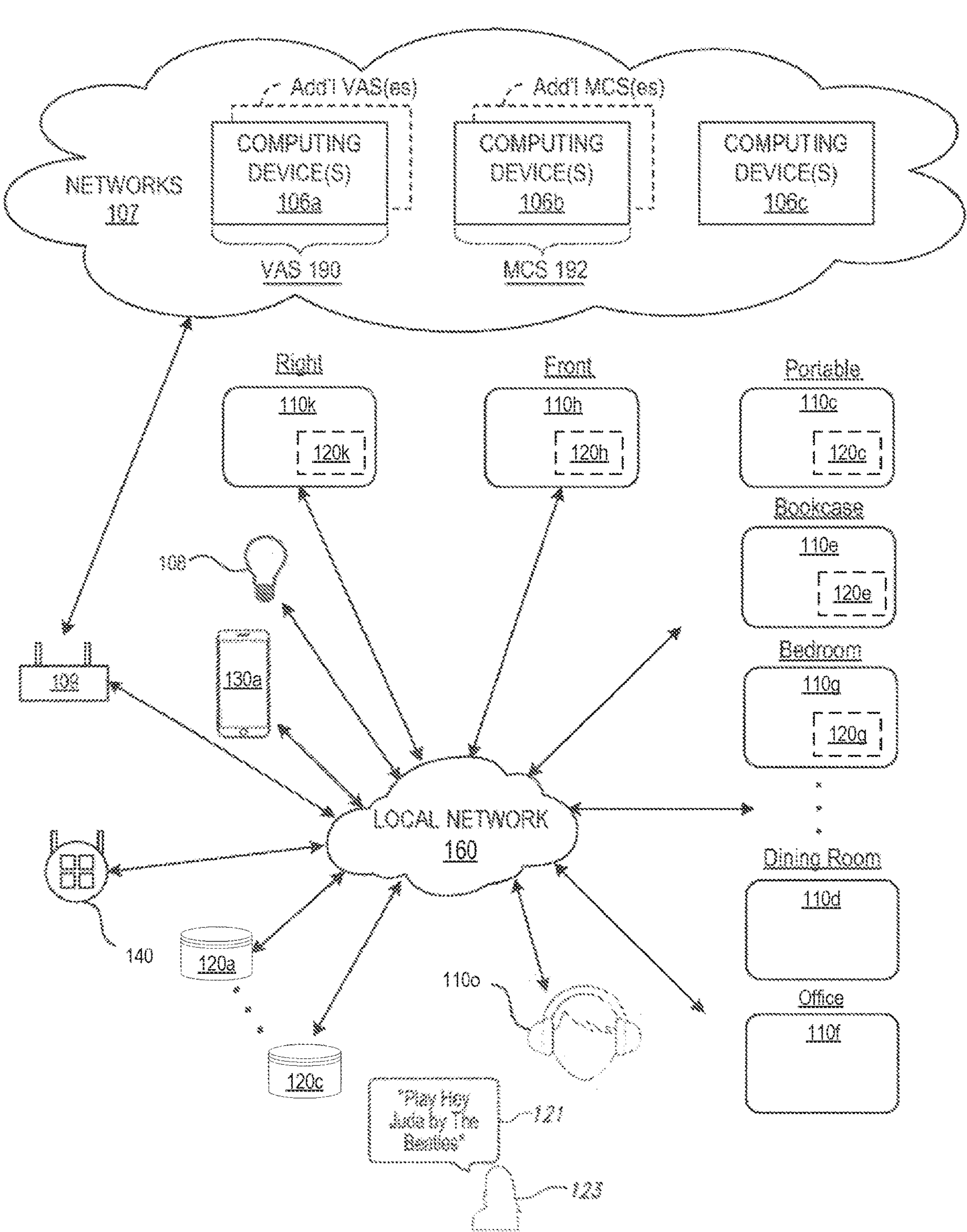
FIG. 1B is a schematic diagram of the media playback system of FIG. 1A and one or more networks.

FIGS. 1A and 1B illustrate an example configuration of a media playback system ("MPS") 100 in which one or more embodiments disclosed herein may be implemented. Referring first to FIG. 1A, a partial cutaway view of MPS 100 distributed in an environment 101 (e.g., a house) is shown. The MPS 100 as shown is associated with an example home environment having a plurality of rooms and spaces. The MPS 100 comprises one or more playback devices 110 (identified individually as playback devices 110*a-o*), one or more network microphone devices ("NMDs") 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the MPS 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the MPS 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the MPS 100 is configured to play back audio from a first playback device (e.g., the playback device 100*a*) in synchrony with a second playback device (e.g., the playback device 100*b*). Interactions between the playback devices 110, NMDs 120, and/or control devices 130 of the MPS 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The MPS 100 can comprise one or more playback zones, some of which may correspond to the rooms in the environment 101. The MPS 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the balcony 101*i*. In some aspects, a single playback zone may include multiple rooms or spaces. In certain aspects, a single room or space may include multiple playback zones.

In the illustrated embodiment of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices.

Referring to FIG. 1B, the home environment may include additional and/or other computing devices, including local network devices, such as one or more smart illumination devices 108 (FIG. 1B), a smart thermostat 140, and a local computing device 105 (FIG. 1A). In embodiments described below, one or more of the various playback devices 110 may be configured as portable playback devices, while others may be configured as stationary playback devices. For example, the headphones 1100 (FIG. 1B) are a portable playback device, while the playback device 110*e* on the bookcase may be a stationary device. As another example, the playback device 110*c* on the Patio may be a battery-powered device, which may allow it to be transported to various areas within the environment 101, and outside of the environment 101, when it is not plugged in to a wall outlet or the like.

With reference still to FIG. 1B, the various playback, network microphone, and control devices 130 and/or other network devices of the MPS 100 may be coupled to one another via point-to-point connections and/or over other connections, which may be wired and/or wireless, via a local network 160 that may include a network router 109. For example, the playback device 110*j* in the Den 101*d* (FIG. 1A), which may be designated as the "Left" device, may have a point-to-point connection with the playback device 110*k*, which is also in the Den 101*d* and may be designated as the "Right" device. In a related embodiment, the Left playback device 110*j* may communicate with other network devices, such as the playback device 110*h*, which may be designated as the "Front" device, via a point-to-point connection and/or other connections via the local network 160.

The local network 160 may be, for example, a network that interconnects one or more devices within a limited area (e.g., a residence, an office building, a car, an individual's workspace, etc.). The local network 160 may include, for example, one or more local area networks (LANs) such as a wireless local area network (WLAN) (e.g., a WIFI network, a Z-Wave network, etc.) and/or one or more personal area networks (PANs) (e.g. a BLUETOOTH network, a wireless USB network, a ZigBee network, an IRDA network, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WIFI" can refer to several different communication protocols including, for example, Institute of Electrical and Electronics Engineers (IEEE) 802.11a, 802.11b, 802.11g, 802.12, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHZ, 6 GHZ, and/or another suitable frequency.

The MPS 100 is configured to receive media content from the local network 160. The received media content can comprise, for example, a Uniform Resource Identifier (URI) and/or a Uniform Resource Locator (URL). For instance, in some examples, the MPS 100 can stream, download, or otherwise obtain data from a URI or a URL corresponding to the received media content.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the environment 101 (FIG. 1A).

In some implementations, the various playback devices 110, NMDs 120, and/or control devices 130 may be communicatively coupled to at least one remote computing device associated with a voice assistant service ("VAS") and/or at least one remote computing device associated with a media content service ("MCS"). For instance, in the illustrated example of FIG. 1B, remote computing devices 106*a* are associated with a VAS 190 and remote computing devices 106*b* are associated with an MCS 192. Although only a single VAS 190 and a single MCS 192 are shown in the example of FIG. 1B for purposes of clarity, the MPS 100 may be coupled to multiple, different VASes and/or MCSes. In some embodiments, the various playback devices 110, NMDs 120, and/or control devices 130 may transmits data associated with a received voice input to a VAS configured to (i) process the received voice input data and (ii) transmit a corresponding command to the MPS 100. In some aspects, for example, the computing devices 106*a* may comprise one or more modules and/or servers of a VAS. In some implementations, VASes may be operated by one or more of SONOS®, AMAZON®, GOOGLE® APPLE®, MICROSOFT®, NUANCE®, or other voice assistant providers. In some implementations, MCSes may be operated by one or more of SPOTIFY, PANDORA, AMAZON MUSIC, GOOGLE PLAY, or other media content services.

In some embodiments, the local network 160 comprises a dedicated communication network that the MPS 100 uses to transmit messages between individual devices and/or to transmit media content to and from MCSes. In certain embodiments, the local network 160 is configured to be accessible only to devices in the MPS 100, thereby reducing interference and competition with other household devices. In other embodiments, however, the local network 160 comprises an existing household communication network (e.g., a household WIFI network). In some embodiments, the MPS 100 is implemented without the local network 160, and the various devices comprising the MPS 100 can communicate with each other, for example, via one or more direct connections, PANs, telecommunication networks (e.g., an LTE network or a 5G network, etc.), and/or other suitable communication links.

In some embodiments, audio content sources may be regularly added or removed from the MPS 100. In some embodiments, for example, the MPS 100 performs an indexing of media items when one or more media content sources are updated, added to, and/or removed from the MPS 100. The MPS 100 can scan identifiable media items in some or all folders and/or directories accessible to the various playback devices and generate or update a media content database comprising metadata (e.g., title, artist, album, track length) and other associated information (e.g., URIs, URLs) for each identifiable media item found. In some embodiments, for example, the media content database is stored on one or more of the various playback devices, network microphone devices, and/or control devices of MPS 100.

As further shown in FIG. 1B, the remote computing devices 106 further include remote computing device 106*c* configured to perform certain operations, such as remotely facilitating media playback functions, managing device and system status information, directing communications between the devices of the MPS 100 and one or multiple VASes and/or MCSes, among other operations. In one example, the remote computing devices 106*c* provide cloud servers for one or more SONOS Wireless HiFi Systems.

In various implementations, one or more of the playback devices 110 may take the form of or include an on-board (e.g., integrated) network microphone device configured to receive voice utterances from a user. For example, the playback devices 110*c*-110*h*, and 110*k* include or are otherwise equipped with corresponding NMDs 120*c*-120*h*, and 120*k*, respectively. A playback device that includes or is equipped with an NMD may be referred to herein interchangeably as a playback device or an NMD unless indicated otherwise in the description. In some cases, one or more of the NMDs 120 may be a stand-alone device. For example, the NMD 1201 may be a stand-alone device. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 110 and 120 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 110*e* because it is physically situated on a bookcase. Similarly, the NMD 1201 may be assigned the named "Island" because it is physically situated on an island countertop in the Kitchen 101*h* (FIG. 1A). Some playback devices may be assigned names according to a zone or room, such as the playback devices 110*g*, 110*d*, and 110*f*, which are named "Bedroom," "Dining Room," and "Office," respectively. Further, certain playback devices may have functionally descriptive names. For example, the playback devices 110*k* and 110*h* are assigned the names "Right" and "Front," respectively, because these two devices are configured to provide specific audio channels during media playback in the zone of the Den 101*d* (FIG. 1A). The playback device 110*c* in the Patio may be named "Portable" because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 120 are configured to interact with the VAS 190 over the local network 160 and/or the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 105, 110, 120, and 130 (FIG. 1A) and/or remote computing devices 106*c* of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. Patent Publication No. 2017-0242653 published Aug. 24, 2017, and titled "Voice Control of a Media Playback System," which is herein incorporated by reference in its entirety.

Upon receiving the stream of sound data, the VAS 190 may determine if there is voice input in the streamed data from the NMD, and if so the VAS 190 may also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the NIPS 100 or indirectly via the VAS 190. In some implementations, the VAS 190 may transmit to the NIPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 110*e* in the environment 101 (FIG. 1A) is in relatively close proximity to the NMD-equipped Living Room playback device 120*b*, and both devices 110*e* and 120*b* may at least sometimes detect the same sound. In such cases, this may require arbitration as to which device is ultimately responsible for providing detected-sound data to the remote VAS. Examples of arbitrating between NMDs may be found, for example, in previously referenced U.S. Patent Publication No. 2017-0242653.

In certain implementations, an NMD may be assigned to, or otherwise associated with, a designated or default playback device that may not include an NMD. For example, the Island NMD 1201 in the Kitchen 101*h* (FIG. 1A) may be assigned to the Dining Room playback device 110*d*, which is in relatively close proximity to the Island NMD 1201. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. Patent Publication No. 2017-0242653.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback devices 110, network microphone devices 120, and/or control devices 130. For example, the technologies herein may be utilized within an environment having a single playback device 110 and/or a single NMD 120. In some examples of such cases, the local network 160 (FIG. 1B) may be eliminated and the single playback device 110 and/or the single NMD 120 may communicate directly with the remote computing devices 106*a-d*. In some embodiments, a telecommunication network (e.g., an LTE network, a 5G network, etc.) may communicate with the various playback devices 110, network microphone devices 120, and/or control devices 130 independent of the local network 160.

b. Suitable Playback Devices

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111*b* includes one or more wireless communication links comprising, for example, a radio frequency (RF), infrared, WIFI, BLUETOOTH, or another suitable communication protocol. In certain embodiments, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 150 via the input/output 111 (e.g., a cable, a wire, a PAN, a BLUETOOTH connection, an ad hoc wired or wireless communication network, and/or another suitable communication link). The local audio source 150 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 150 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 150. In other embodiments, however, the media playback system omits the local audio source 150 altogether. In some embodiments, the playback device 110*a* does not include an input/output 111 and receives all audio content via the local network 160.

The playback device 110*a* further comprises electronics 112, a user interface 113 (e.g., one or more buttons, knobs, dials, touch-sensitive surfaces, displays, touchscreens), and one or more transducers 114 (e.g., a driver), referred to hereinafter as "the transducers 114." The electronics 112 is configured to receive audio from an audio source (e.g., the local audio source 150) via the input/output 111, one or more of the computing devices 106*a-c* via the local network 160 (FIG. 1B)), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power components 112*i* (e.g., one or more power supplies, power cables, power receptacles, batteries, induction coils, Power-over Ethernet (POE) interfaces, and/or other suitable sources of electric power).

In some embodiments, the electronics 112 optionally include one or more other components 112*j* (e.g., one or more sensors, video displays, touchscreens, battery charging bases). In some embodiments, the playback device 110*a* and electronics 112 may further include one or more voice processing components that are operable coupled to one or more microphones, and other components as described below with reference to FIGS. 1F and 1G.

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some embodiments, the operations further include causing the playback device 110*a* to send audio data to another one of the playback devices 110*a* and/or another device (e.g., one of the NMDs 120). Certain embodiments include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the MPS 100. In some aspects, for example, the state data is shared during predetermined intervals of time (e.g., every 5 seconds, every 10 seconds, every 60 seconds) among at least a portion of the devices of the MPS 100, so that one or more of the devices have the most recent data associated with the MPS 100.

The network interface 112*d* is configured to facilitate a transmission of data between the playback device 110*a* and one or more other devices on a data network. The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the local network 160 (FIG. 1B) in accordance with a suitable wireless communication protocol (e.g., WIFI, BLUETOOTH, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

In some implementations, the power components 112*i* of the playback device 110*a* may additionally include an internal power source (e.g., one or more batteries) configured to power the playback device 110*a* without a physical connection to an external power source. When equipped with the internal power source, the playback device 110*a* may operate independent of an external power source. In some such implementations, an external power source interface may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The user interface 113 may facilitate user interactions independent of or in conjunction with user interactions facilitated by one or more of the control devices 130 (FIG. 1A). In various embodiments, the user interface 113 includes one or more physical buttons and/or supports graphical interfaces provided on touch sensitive screen(s) and/or surface(s), among other possibilities, for a user to directly provide input. The user interface 113 may further include one or more of lights (e.g., LEDs) and the speakers to provide visual and/or audio feedback to a user.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

In some embodiments, the playback device 110*a* may include a speaker interface for connecting the playback device to external speakers. In other embodiments, the playback device 110*a* may include an audio interface for connecting the playback device to an external audio amplifier or audio-visual receiver.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with playback device 110*i*, is configured to render only the mid-range and high frequency components of a particular audio content, while the playback device 110*i* renders the low frequency component of the particular audio content. In some embodiments, the bonded playback device 110*q* includes additional playback devices and/or another bonded playback device.

In some embodiments, one or more of the playback devices 110 may take the form of a wired and/or wireless headphone (e.g., an over-ear headset, an on-ear headset, or an in-ear headset). For instance, FIG. 2C shows an example headset assembly 400 ("headset 400") for such an implementation of one of the playback devices 110. As shown, the headset 400 includes a headband 402 that couples a first earcup 404*a* to a second earcup 404*b*. Each of the earcups 404*a* and 0244*b* may house any portion of the electronic components in the playback device 110, such as one or more speakers. Further, one or more of the earcups 404*a* and 404*b* may include a user interface for controlling audio playback, volume level, and other functions. The user interface may include any of a variety of control elements such as a physical button 408, a slider, a knob, and/or a touch control surface. As shown in FIG. 2C, the headset 400 may further include ear cushions 406*a* and 406*b* that are coupled to ear cups 404*a* and 404*b*, respectively. The ear cushions 406*a* and 406*b* may provide a soft barrier between the head of a user and the earcups 404*a* and 404*b*, respectively, to improve user comfort and/or provide acoustic isolation from the ambient (e.g., passive noise reduction (PNR)).

As described in greater detail below, the electronic components of a playback device may include one or more network interface components (not shown in FIG. 2C) to facilitate wireless communication over one more communication links. For instance, a playback device may communicate over a first communication link 401*a* (e.g., a BLUETOOTH link) with one of the control devices 130 and/or over a second communication link 401*b* (e.g., a WIFI or cellular link) with one or more other computing devices 410 (e.g., a network router and/or a remote server). As another possibility, a playback device may communicate over multiple communication links, such as the first communication link 401*a* with the control device 130*a* and a third communication link 401*c* (e.g., a WIFI or cellular link) between the control device 130*a* and the one or more other computing devices 410. Thus, the control device 130*a* may function as an intermediary between the playback device and the one or more other computing devices 410, in some embodiments.

It should be appreciated that one or more of the playback devices 110 may take the form of other wearable devices separate and apart from a headphone. Wearable devices may include those devices configured to be worn about a portion of a subject (e.g., a head, a neck, a torso, an arm, a wrist, a finger, a leg, an ankle, etc.). For example, the playback devices 110 may take the form of a pair of glasses including a frame front (e.g., configured to hold one or more lenses), a first temple rotatably coupled to the frame front, and a second temple rotatable coupled to the frame front. In this example, the pair of glasses may comprise one or more transducers integrated into at least one of the first and second temples and configured to project sound towards an ear of the subject.

c. Suitable Network Microphone Devices (NMD)s

Figures 1F, 1G, 1H:
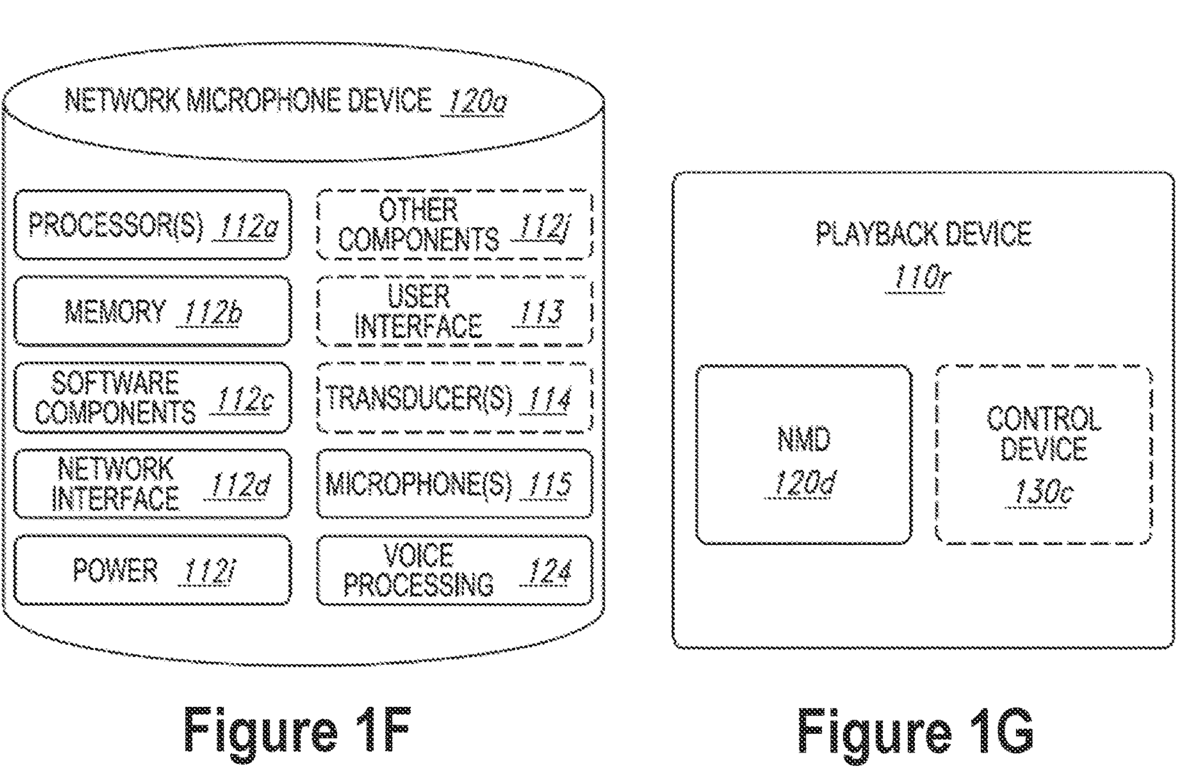
FIG. 1F is a block diagram of an example network microphone device.
FIG. 1G is a block diagram of an example playback device.
FIG. 1H is a partially schematic diagram of an example control device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio components 112*g* (FIG. 1C), the amplifiers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing components 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing components 124 (FIG. 1F). The microphones 115 are configured to detect sound (i.e., acoustic waves) in the environment of the playback device 110*r*, which is then provided to voice processing components 124. More specifically, each microphone 115 is configured to detect sound and convert the sound into a digital or analog signal representative of the detected sound, which can then cause the voice processing component to perform various functions based on the detected sound, as described in greater detail below. In some implementations, the microphones 115 may be arranged as an array of microphones (e.g., an array of six microphones). In some implementations the playback device 110*r* may include fewer than six microphones or more than six microphones. The playback device 110*r* optionally includes an integrated control device 130*c*. The control device 130*c* can comprise, for example, a user interface configured to receive user input (e.g., touch input, voice input) without a separate control device. In other embodiments, however, the playback device 110*r* receives commands from another control device (e.g., the control device 130*a* of FIG. 1B).

In operation, the voice-processing components 124 are generally configured to detect and process sound received via the microphones 115, identify potential voice input in the detected sound, and extract detected-sound data to enable a VAS, such as the VAS 190 (FIG. 1B), to process voice input identified in the detected-sound data. The voice processing components 124 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 124 may include or otherwise take the form of one or more DSPs or one or more modules of a DSP. In this respect, certain voice processing components 124 may be configured with particular parameters (e.g., gain and/or spectral parameters) that may be modified or otherwise tuned to achieve particular functions. In some implementations, one or more of the voice processing components 124 may be a subcomponent of the processor 112*a*.

In some implementations, the voice-processing components 124 may detect and store a user's voice profile, which may be associated with a user account of the MPS 100. For example, voice profiles may be stored as and/or compared to variables stored in a set of command information or data table. The voice profile may include aspects of the tone of frequency of a user's voice and/or other unique aspects of the user's voice, such as those described in previously-referenced U.S. Patent Publication No. 2017-0242653.

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing components 124 receive and analyze the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing components 124 monitor the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Controller Devices

FIG. 1H is a partially schematic diagram of one of the control device 130*a* (FIGS. 1A and 1B). As used herein, the term "control device" can be used interchangeably with "controller," "control device," or "control system." Among other features, the control device 130*a* is configured to receive user input related to the MPS 100 and, in response, cause one or more devices in the MPS 100 to perform an action(s) or operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the MPS 100. In other embodiments, as described above with respect to FIG. 1G, the control device 130*a* is integrated into another device in the MPS 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the MPS 100. The memory 132*b* can comprise data storage that can be loaded with one or more of the software components executable by the processor 302 to perform those functions. The software components 132*c* can comprise applications and/or other executable software configured to facilitate control of the MPS 100. The memory 112*b* can be configured to store, for example, the software components 132*c*, media playback system controller application software, and/or other data associated with the MPS 100 and the user.

The network interface 132*d* is configured to facilitate network communications between the control device 130*a* and one or more other devices in the MPS 100, and/or one or more remote devices. In some embodiments, the network interface 132 is configured to operate according to one or more suitable communication industry standards (e.g., infrared, radio, wired standards including IEEE 802.3, wireless standards including IEEE 802.11a, 802.11b, 802.11g, 802.12, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 130*a* to one or more of the playback devices 100. The network interface 132*d* can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others. Additional description of zones and groups can be found below with respect to FIGS. 1J through 2.

Figure 1I:
FIG. 1I is a schematic diagram of example user interfaces of the example control device of FIG. 1H.

The user interface 133 is configured to receive user input and can facilitate control of the MPS 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system. FIG. 1I shows two additional user interface displays 133*f* and 133*g* of user interface 133. Additional examples are also possible.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

e. Suitable Playback Device Configurations

Figure 2:
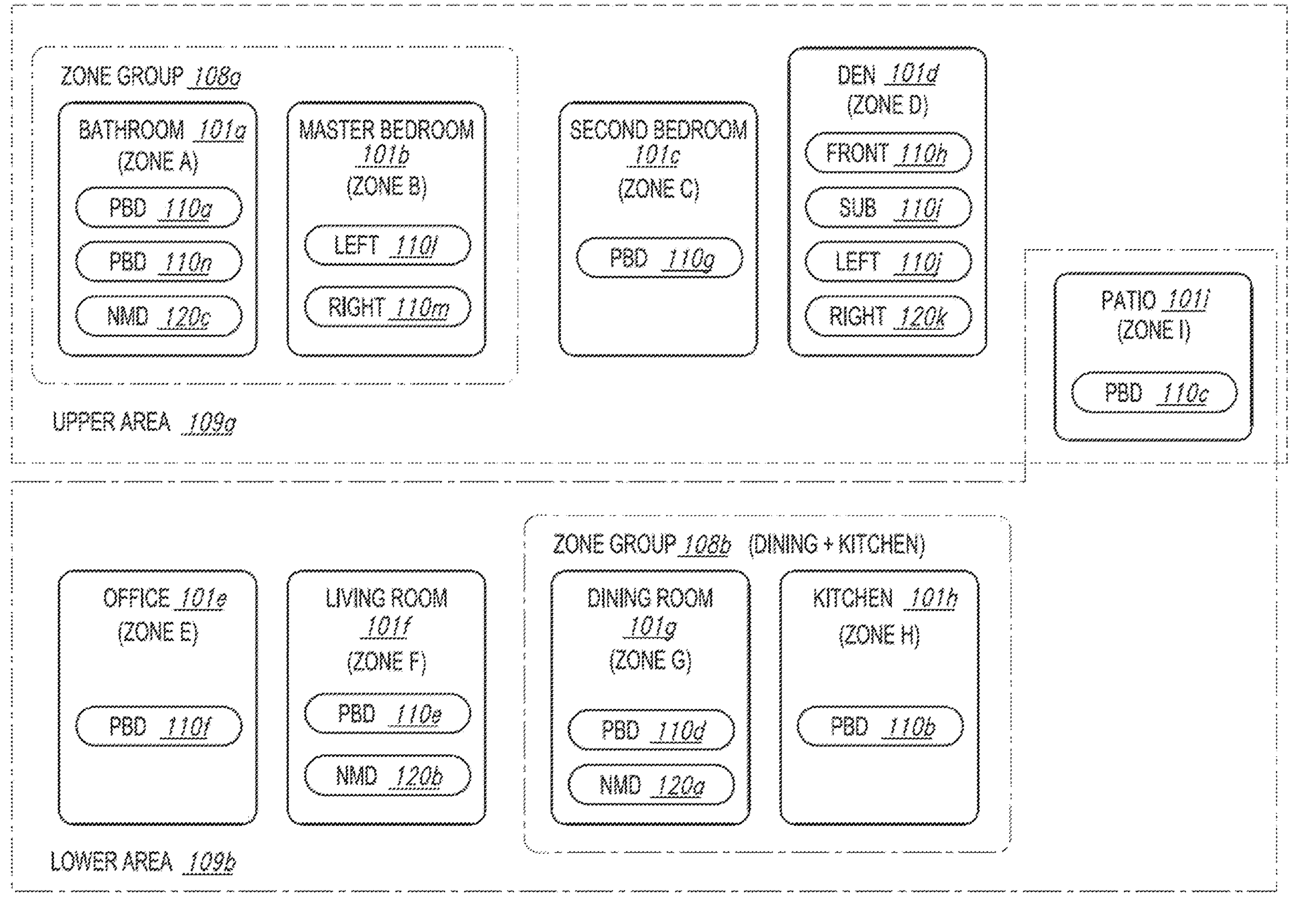
FIG. 2 is a schematic diagram of example media playback system areas.

FIGS. 1J, 1K, IL, 1M, and 2 show example configurations of playback devices in zones and zone groups. Referring first to FIG. 2, in one example, a single playback device may belong to a zone. For example, the playback device 110*g* in the second bedroom 101*c* (FIG. 1A) may belong to Zone C. In some implementations described below, multiple playback devices may be "bonded" to form a "bonded pair" which together form a single zone. For example, the playback device 110*l* (e.g., a left playback device) can be bonded to the playback device 110*l* (e.g., a left playback device) to form Zone A. Bonded playback devices may have different playback responsibilities (e.g., channel responsibilities). In another implementation described below, multiple playback devices may be merged to form a single zone. For example, the playback device 110*h* (e.g., a front playback device) may be merged with the playback device 110*i* (e.g., a subwoofer), and the playback devices 110*j* and 110*k* (e.g., left and right surround speakers, respectively) to form a single Zone D. In another example, the playback zones 110*g* and 110*h* can be merged to form a merged group or a zone group 108*b*. The merged playback zones 110*g* and 110*h* may not be specifically assigned different playback responsibilities. That is, the merged playback zones 110*h* and 110*i* may, aside from playing audio content in synchrony, each play audio content as they would if they were not merged.

Each zone in the MPS 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1J, the playback devices 110*l* and 110*m* may be bonded so as to produce or enhance a stereo effect of audio content. In this example, the playback device 110*l* may be configured to play a left channel audio component, while the playback device 110*k* may be configured to play a right channel audio component. In some implementations, such stereo bonding may be referred to as "pairing."

Additionally, bonded playback devices may have additional and/or different respective speaker drivers. As shown in FIG. 1K, the playback device 110*h* named Front may be bonded with the playback device 110*i* named SUB. The Front device 110*h* can be configured to render a range of mid to high frequencies and the SUB device 110*i* can be configured render low frequencies. When unbonded, however, the Front device 110*h* can be configured render a full range of frequencies. As another example, FIG. 1L shows the Front and SUB devices 110*h* and 110*i* further bonded with Left and Right playback devices 110*j* and 110*k*, respectively. In some implementations, the Right and Left devices 110*j* and 110*k* can be configured to form surround or "satellite" channels of a home theater system. The bonded playback devices 110*h*, 110*i*, 110*j*, and 110*k* may form a single Zone D (FIG. 2).

Playback devices that are merged may not have assigned playback responsibilities and may each render the full range of audio content the respective playback device is capable of. Nevertheless, merged devices may be represented as a single UI entity (i.e., a zone, as discussed above). For instance, the playback devices 110*a* and 110*n* in the master bathroom have the single UI entity of Zone A. In one embodiment, the playback devices 110*a* and 110*n* may each output the full range of audio content each respective playback devices 110*a* and 110*n* are capable of, in synchrony.

In some embodiments, an NMD is bonded or merged with another device so as to form a zone. For example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 2, Zone A may be grouped with Zone B to form a zone group 108*a* that includes the two zones. Similarly, Zone G may be grouped with Zone H to form the zone group 108*b*. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234, 395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108*b* can be assigned a name such as "Dining+Kitchen", as shown in FIG. 2. In some embodiments, a zone group may be given a unique name selected by a user.

Certain data may be stored in a memory of a playback device (e.g., the memory 112*c* of FIG. 1C) as one or more state variables that are periodically updated and used to describe the state of a playback zone, the playback device(s), and/or a zone group associated therewith. The memory may also include the data associated with the state of the other devices of the media system and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101*c* may indicate that the playback device is the only playback device of the Zone C and not in a zone group. Identifiers associated with the Den may indicate that the Den is not grouped with other zones but includes bonded playback devices 110*h*-110*k*. Identifiers associated with the Dining Room may indicate that the Dining Room is part of the Dining+Kitchen zone group 108*b* and that devices 110*b* and 110*d* are grouped (FIG. 1M). Identifiers associated with the Kitchen may indicate the same or similar information by virtue of the Kitchen being part of the Dining+Kitchen zone group 108*b*. Other example zone variables and identifiers are described below.

In yet another example, the MPS 100 may include variables or identifiers representing other associations of zones and zone groups, such as identifiers associated with Areas, as shown in FIG. 2. An area may involve a cluster of zone groups and/or zones not within a zone group. For instance, FIG. 2 shows an Upper Area 109*a* including Zones A-D, and a Lower Area 109*b* including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. Pat. No. 10,712,997 filed Aug. 21, 2017, and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

Figure 3:
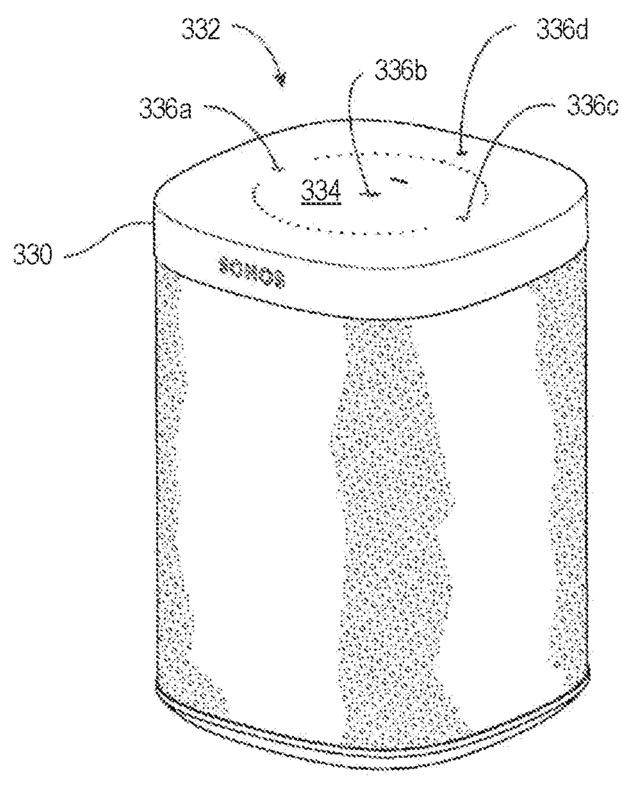
FIG. 3 is an isometric diagram of an example playback device housing.

FIG. 3 shows an example housing 330 of the playback device 110 that includes a user interface in the form of a control area 332 at a top portion 334 of the housing 330. The control area 332 includes buttons 336-*c* for controlling audio playback, volume level, and other functions. The control area 332 also includes a button 236*d* for toggling the microphones 222 to either an on state or an off state. The control area 332 is at least partially surrounded by apertures formed in the top portion 334 of the housing 330 through which the microphones 222 (not visible in FIG. 3) receive the sound in the environment of the playback device 102. The microphones 222 may be arranged in various positions along and/or within the top portion 334 or other areas of the housing 330 so as to detect sound from one or more directions relative to the playback device 110.

Figure 4:
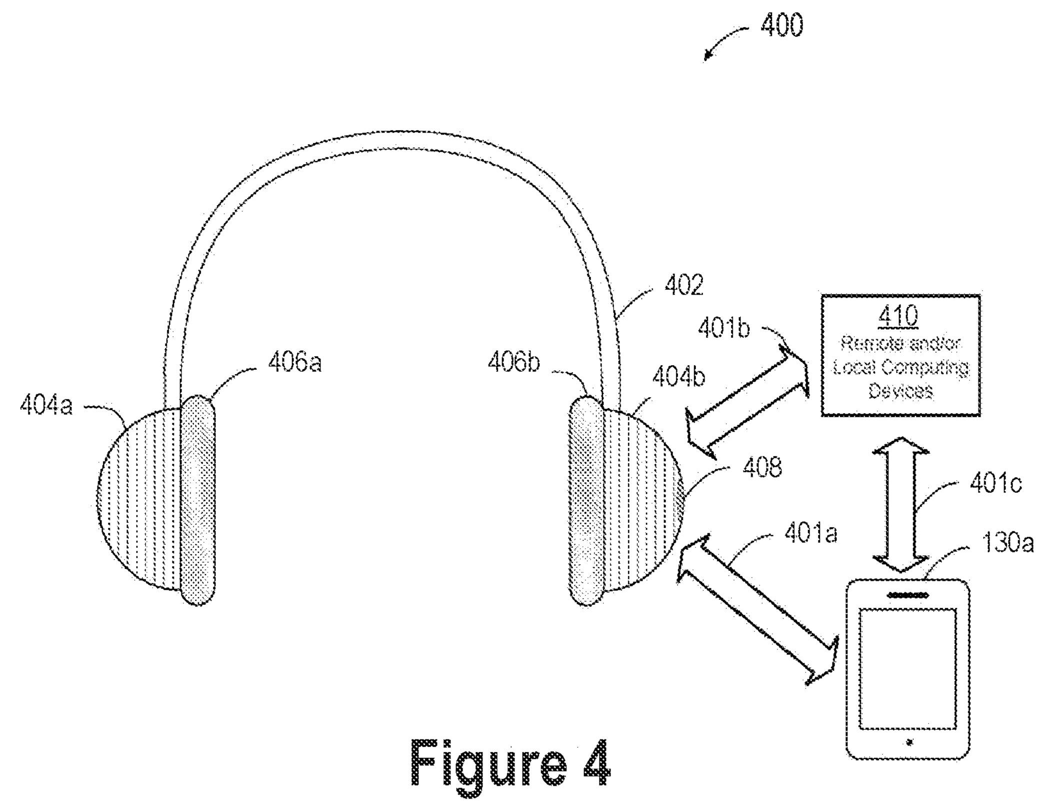
FIG. 4 is a diagram of an example headset assembly for the playback device of FIG. 3.

In some embodiments, the playback device 110 may take the form of a wired and/or wireless headphone device (e.g., an over-ear headset, an on-ear headset, or an in-ear headset). For instance, FIG. 4 shows an example headset assembly 400 ("headset 400") for such an implementation of the playback device 110. As shown, the headset 400 includes a headband 402 that couples a first earcup 404*a* to a second earcup 404*b*. Each of the earcups 404*a* and 404*b* may house any portion of the electronic components in the playback device 110, such as one or more speakers. Further, one or more of the earcups 404*a* and 404*b* may include a user interface for controlling audio playback, volume level, and other functions. The user interface may include any of a variety of control elements such as a physical button 408, a slider, a knob, and/or a touch control surface. As shown in FIG. 4, the headset 400 may further include ear cushions 406*a* and 406*b* that are coupled to ear cups 404*a* and 404*b*, respectively. The ear cushions 406*a* and 406*b* may provide a soft barrier between the head of a user and the earcups 404*a* and 404*b*, respectively, to improve user comfort and/or provide acoustic isolation from the ambient (e.g., passive noise reduction (PNR)).

In some instances, the headset may take the form of a hearable device. Hearable devices may include those headphone devices (e.g., ear-level devices) that are configured to provide a hearing enhancement function while also supporting playback of media content (e.g., streaming media content from a user device over a PAN, streaming media content from a streaming music service provider over a WLAN and/or a cellular network connection, etc.). In some instances, a hearable device may be implemented as an in-ear headphone device that is configured to playback an amplified version of at least some sounds detected from an external environment (e.g., all sound, select sounds such as human speech, etc.).

III. Example Smart Networking Techniques for Portable Playback Devices

As discussed above, certain electronic components within a device may be put to sleep when idle to reduce the power consumption of the device. Additionally, the device's networking behavior may be updated when changes to the device's network environment are detected while the electronic components of the device are in a sleep state. For example, electronic components that are associated with specific commands (e.g., streaming music over a wireless network) may be put to sleep when receiving such a specific command from a user is unlikely (e.g., no known wireless networks are within range). Conversely, such electronic components may be woken up, absent user action, upon detecting that a known wireless network is in range. When such a change to the device's networking environment is detected and the electronic components are woken up, the processing components may update a flag state variable indicating a mode of operation in which the device should operate upon receiving a subsequent user command. For example, if the playback device detects that a known WIFI network is in range, the processing components may update the flag state variable to indicate At-Home, which indicates that the networking components should establish a connection to the known WIFI network in preparation for receiving a user command (e.g., play audio content) and processing that command (e.g., obtain and play back audio content) over the WIFI network.

Figure 5:
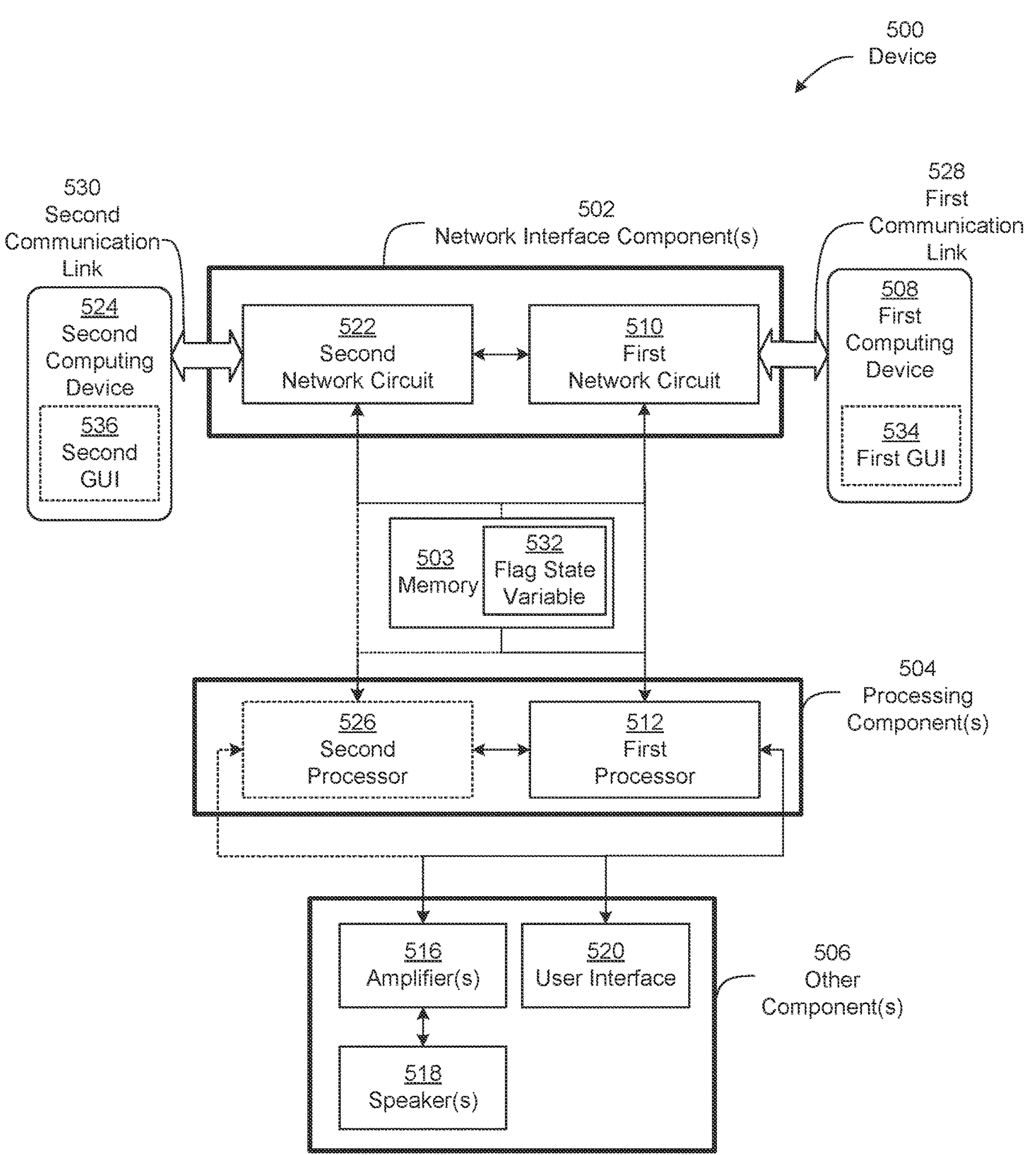
FIG. 5 is a block diagram of certain components of an example device capable of employing the disclosed techniques.

Turning to FIG. 5, an example device 500 that employs the power management and networking behavior management techniques described herein is shown. The device 500 may be implemented as any of a variety of devices including any of the devices described herein (e.g., playback devices, NMDs, etc.).

As shown in FIG. 5, the device 500 comprises network interface components 502 to facilitate communication with external devices. The network interface components 502 include a first network circuit 510 to facilitate communication with a first computing device 508 over a first communication link 528 and a second network circuit 522 to facilitate communication with a second computing device 524 over a second communication link 530. The device 500 further includes processing components 504 that are coupled to the network interface components 502. The processing components include a first processor 512 and a second processor 526. The first processor 512 and/or the second processor 526 may execute instructions stored in a memory 503. The device 500 further includes other components 506 that perform various operations of the device. Examples of such other components 506 include amplifiers 516, speakers 518, and/or user interface 520. The components shown in FIG. 5 may be attached to one or more circuit boards within the device 500 to form one or more modules (e.g., circuit board assemblies). These components may be distributed between the one or more circuit boards within the device 500 in any fashion.

The network interface components 502 may facilitate wireless communication to one or more external devices shown as the first computing device 508 and the second computing device 524. The network interface components 502 may comprise the first network circuit 510 that enables communication over the first communication link 528 using a first communication protocol and a second network circuit 522 that enables communication over the second communication link 530 using a second, different communication protocol. For example, the first network circuit 510 may enable communication using an IEEE 802 protocol and/or a cellular network protocol while the second network circuit 522 may enable communication using another protocol, such as a BLUETOOTH protocol. Thus, the network interface components 502 may enable communication (e.g., simultaneous communication) with multiple computing devices using different communication protocols. Furthermore, although not shown in FIG. 5, it should be understood that the first network circuit 510 and the second network circuit 522 may enable contemporaneous communication with more than one wireless network/device using each circuit's respective protocol (e.g., simultaneous communication with a BLE beacon and a BLUETOOTH-enabled device via a BLUETOOTH network).

In some embodiments, the first network circuit 510 may be implemented as a WIFI circuit that is configured to communicate with the first computing device 508 having a corresponding first graphical user interface ("GUI") 534 which may be accessed by a user to interact with the device 500 (e.g., issue a command to play audio content) over one or more WIFI networks. The first computing device 508 may be, for example, a network router or a computing device that is accessible over the Internet (e.g., a cloud server). The first computing device 508 may also be, for example, a user device (e.g., a smartphone). Additionally, the second network circuit 522 may be implemented as a BLUETOOTH circuit that is configured to communicate with the second computing device 524 having a corresponding second GUI 536, which may be accessed by the user to interact with the device 500, over one or more BLUETOOTH networks. The second computing device 524 may be, for example, a user device such as a smartphone, laptop, or a tablet such as the control device 130. In such an instance, the second network circuit 522 may connect simultaneously to one or both of a BLUETOOTH classic network and a BLE network, receive commands to play audio content over one network, and obtain and play back audio content over the other network. It should be appreciated that, in at least one instance, the first computing device 508 and the second computing device 524 may be the same device. For example, a user device may be simultaneously connected to multiple networks in common with the device 500 (e.g., a BLE network and a WLAN).

The network circuits 510 and 522 may comprise one or more network processors that execute instructions stored in a memory that cause the network circuits 510 and 522 to perform various operations. For example, the network circuits 510 and 522 may each comprise a read-only memory (ROM) that stores firmware that may be executed by the one or more network processors. Additionally (or alternatively), the network circuits 510 and 522 may comprise a read-write memory (e.g., a memory that is both readable and writable) that stores instructions that may be executed by the one or more network processors. The network processors may be, for example, low-power processors such as CORTEX-M series processors by ARM (e.g., Cortex-M3 processor, Cortex M4 processor, etc.). In some embodiments, the one or more network processors may access a memory outside of the network interface components 502, such as the memory 503. In these embodiments, the memory 503 may also be accessible by the processing components 504 (e.g., the first processor 512 and/or the second processor 526). In some embodiments, the memory 503 may be a flash memory. In such embodiments, instructions may be stored in segments on different memory components and accessed by the network interface components 502 or the processing components 504 for execution. For example, a first segment of a set of instructions may be stored in the ROM of network circuits 510 and/or 522, and a second segment of the set of instructions may be stored in a flash memory. In other embodiments, the one or more network processors may not have direct access to an external memory that is shared with the processing components 504 (e.g., the one or more network processors may not have direct access to memory 503).

In some embodiments, the first network circuit 510 may be specially configured to perform operations beyond facilitating communication over a wireless network. For example, the first network circuit 510 may be configured to detect the presence of one or more known wireless network (e.g., a WLAN such as a WIFI network) and provide an output signal to the processing components when a particular wireless network is detected. Thus, the task of detecting the presence of a known wireless network may be offloaded from the processing components 504 to the first network circuit 510. As a result, portions of the processing components 504 (e.g., the first processor 512) may be put to sleep until a wireless network is detected (e.g., indicating a transition from away mode to at-home mode) and the power consumption of the device 500 may be reduced. Example techniques that may be employed by the first network circuit 510 to detect a wireless network and provide an output signal to the processing components 504 are described in more detail in PCT Patent Publication No. WO/2020/150595 referenced above. In a similar way, the first network circuit 510 may detect when a connection to a known wireless network becomes unavailable (e.g., indicating a transition from at-home mode to away mode), such as when a portable playback device is moved away from the known wireless network.

Additionally, the second network circuit 522 may be specially configured to perform operations beyond facilitating communication over one or more wireless networks. In some embodiments, the second network circuit 522 may be configured to detect proximity to a known device such as another playback device (e.g., detect a wireless signal, such as a BLE wireless beacon, emitted by the known device). In these embodiments, the second network circuit 522 may provide an output signal to the processing components 504 when the presence of a known device is detected. Thus, the task of detecting the presence of a known device may be offloaded from the processing components 504 to the second network circuit 522. As a result, portions of the processing components 504 (e.g., the first and/or second processors 512 and 526, respectively) may be put to sleep until a known device is detected and the power consumption of the device 500 may be reduced. For example, the device 500 may be a portable device (e.g., a portable playback device) and the second network circuit 522 may be configured to detect one or more wireless signals (e.g., a wireless beacon such as a BLE beacon) emitted by one or more stationary devices (e.g., a stationary playback device) that is located in the home of a user. In this example, the second network circuit 522 may provide an output signal to the processing components 504 when a wireless signal emitted by a stationary device is detected (e.g., to indicate that the user is somewhere in or near their home). The processing components 504 may, in turn, cause the device 500 to attempt to find and/or connect to one or more wireless networks (e.g., a user's home network). As a result, portions of the processing components 504 (e.g., the first processor 512) may be put to sleep until a wireless network is likely within range (e.g., indicating a transition from away mode to at-home mode) and the power consumption of the device 500 may be reduced.

It should be appreciated that the network interface components 502 may be implemented as one or more circuit dies integrated into one or more circuit packages. For example, the network interface components 502 may be implemented as a single circuit die integrated into a single package. In another example, the first network circuit 510 may be implemented as a first circuit die and the second network circuit 522 may be implemented as a second circuit die. In this example, the first and second circuit dies may be integrated into a single circuit package or separate circuit packages. Thus, the network interface components 502 may be implemented in any of a variety of ways.

The memory 503 may be coupled to the network interface components 502 (e.g., the first network circuit 510 and/or the second network circuit 522) and/or the processing components 504 (e.g., the first processor 512 and/or the second processor 526). The memory 503 may be, for example, a tangible, non-transitory, computer-readable medium configured to store instructions that are executable. The memory 503 may comprise a volatile memory (e.g., a memory that only maintains data while powered) and/or non-volatile memory (e.g., a memory that maintains data even after being power cycled). The memory 503 may be, in some embodiments, a read-write memory.

The flag state variable 532 may be a value that is stored in the memory 503. The flag state variable 532 may include one or more status flags corresponding to the modes of operation in which the device 500 is capable of operating. For example, the flag state variable 532 may include an At-Home flag, which indicates to the network interface components 502 that a connection to a wireless LAN network should be established. Additionally, the flag state variable 532 may include an Away flag, which indicates to the network interface components 502 that a connection to a wireless PAN network should be established. In some cases, the flag state variable 532 may consist of a single, binary variable that can be set to one of two different values. Various other types of flag state variables are also possible.

In this way, the flag state variable 532 may dictate the networking behavior of the network interface components 502. For example, when the processing components 504 detect that a user's home WIFI network is in range, the processing components 504 may update the flag state variable 532 accordingly (e.g., by setting the flag state variable to At-Home). As a result, the network interface components 502 may, based on the indicated flag state, establish a connection with the appropriate network (e.g., user's home WIFI network) in preparation for receiving a user command and processing the command over that network. The process of updating the flag state variable is discussed in more detail below with reference to FIGS. 6A-6C.

The processing components 504 may be coupled to the network interface components 502 and configured to control one or more aspects of the operation of the device 500. The processing components 504 may comprise processors 512 and 526 that may each execute instructions stored in a memory, such as memory 503. In some embodiments, the first processor 512 may handle operations involving communication via the first network circuit 510 while the second processor 526 may handle operations involving communication via the second network circuit 526. Thus, the first processor 512 may advantageously be put to sleep when no operations involving communication via the first network circuit 510 are likely to occur in the near future (e.g., no wireless networks for the first network circuit 510 to connect to are in range). Similarly, the second processor 526 may be put to sleep when no operations involving communication via the second network circuit 526 are likely to occur in the near future (e.g., no wireless networks for the second network circuit 526 to connect to are in range). For example, the first processor 512 may handle operations involving the playback of music streamed over the Internet via the first network circuit 510 while the second processor 526 may handle operations involving the playback of music streamed over a BLUETOOTH communication link via the second network circuit 522. In this example, the first processor 512 may be advantageously put to sleep in situations where music is unlikely to be streamed over the Internet (e.g., no WIFI networks are within range). Similarly, the second processor 526 may advantageously be put to sleep in situations where music is unlikely to be streamed over BLUETOOTH (e.g., no BLUETOOTH networks are within range). Given the different nature of the operations each of processors 512 and 526 may handle, the first processor 512 may, in some embodiments, have a different construction than the second processor 526. For example, the first processor 512 may be a general-purpose processor (GPP), such as an application processor, while the second processor may not be a GPP, such as a digital signal processor (DSP) or some other special-purpose processor (SPP). In other embodiments, the processors 512 and 526 may have the same (or similar) constructions. For example, the processors 512 and 526 may both be GPPs. In this example, the processors 512 and 526 may have the same architecture or different architectures. It should be appreciated that the second processor 526 may be omitted in some instances and the functions described herein attributed to the second processor 526 may be performed by the first processor 512.

The processing components 504 may be configured to change the power state of the first processor 512 to reduce the power consumption of the device 500 in instances where the device is unlikely to receive a command that invokes the first processor 512. In some embodiments, the processing components 504 may keep the first processor 512 in a sleep state (e.g., a deep sleep or a light sleep state) while the first processor 512 is unlikely to be needed (e.g., the first network circuit 510 does not detect any known wireless networks in range and the device 500 is not being used). In these embodiments, the processing components 504 may wake-up the first processor 512 when an output signal is received from network interface components 502 (e.g., the first network circuit 510 and/or the second network circuit 522) indicating one or more of the following: a known wireless network is within range, another device is within range, and the device 500 is currently located within a specific area (e.g., within a user's home, proximate a user's home, within a user's workplace, proximate a user's workplace, etc.). Furthermore, processing components 504 may be configured to access and/or update the flag state variable 532, which may be used by the network interface components 502 to determine which network circuit to use to connect to the wireless network and execute commands accordingly. Example techniques that may be performed by the processing components 504 to wake-up the first processor 512 and execute commands are described in greater detail in PCT Patent Publication No. WO/2020/150595 referenced above. Example techniques that may be performed to update the flag state variable 532 are described in greater detail below with reference to FIGS. 6A, 6B, and 6C.

It should be appreciated that the first processor 512 and the second processor 526 may be implemented in any of a variety of ways. In some embodiments, the first processor 512 may be separate and distinct from the second processor 526. For example, each of the first and second processors 512 and 526 may have their own set of one or more processor caches and/or be implemented on their own circuit dies. In other embodiments, the first processor 512 may be integrated with the second processor 526. For example, the first and second processors 512 and 526 may be implemented as a multi-core processor including a first processor core that operates as the first processor 512 and a second processor core that operates at the second processor 526. In this example, the first and second processors 512 and 526, respectively, may share one or more processor caches or have entirely separate processor caches. Still yet further, one or more of the first processor 512 and the second processor 526 may be multi-core processors.

The other components 506 may comprise any of a variety of components depending on the implementation of the device 500. In some embodiments, the device 500 may be implemented as a playback device configured to playback audio content. In these embodiments, the other components 506 may comprise various electronic components to facilitate playback of audio content such as amplifiers 516 that are configured to drive speakers 518. The speakers 518 may be external to the device 500 or integrated with the device 500. In other embodiments, the device 500 may be implemented as an NMD. In these embodiments, the other components 506 may comprise various components to detect speech such as microphones.

In some embodiments, the other components 506 may comprise a user interface 520 which may be configured to interact with the other components 506, the processing components 504, and/or the network interface components 502, and provide feedback to a user. For example, in such embodiments, the processing components 504 may cause the device 500 to update the user interface 520 to provide feedback (e.g., audio and/or visual feedback) to indicate, for example, the mode of operation or power state in which the device 500 is operating at a given time. For example, if the device 500 is operating in an At-Home mode (i.e., connected to and playing back audio content over a WIFI network), the user interface 520 may display white-colored LED lights. Conversely, if the device 500 is operating in an Away mode (i.e., connected to and playing back audio content over a BLUETOOTH network), the user interface 520 may display blue-colored LED lights. Similarly, the device 500 may update the user interface 520 based on the power state of the device 500 as well (e.g., display a green LED light while in an awake power state). The user interface 520 may be configured to provide audio feedback as well. For example, the user interface may play a first audio (e.g., a tune, a voice output, etc.) upon connecting to a WIFI network, a second audio upon connecting to a BLUETOOTH network, and/or a third audio when disconnecting from a network. The user interface 520 may provide other types of feedback as well.

It should be appreciated that one or more components may be omitted from the device 500 without departing from the scope of the present disclosure. In some embodiments, the device 500 may only communicate using a single protocol (or set of protocols), such as IEEE 802 protocols, and the second network circuit 522 that enables communication with the second computing device 524 may be omitted. Additionally (or alternatively), the device 500 may only employ a single processor and the second processor 526 may be omitted.

Figure 6A:
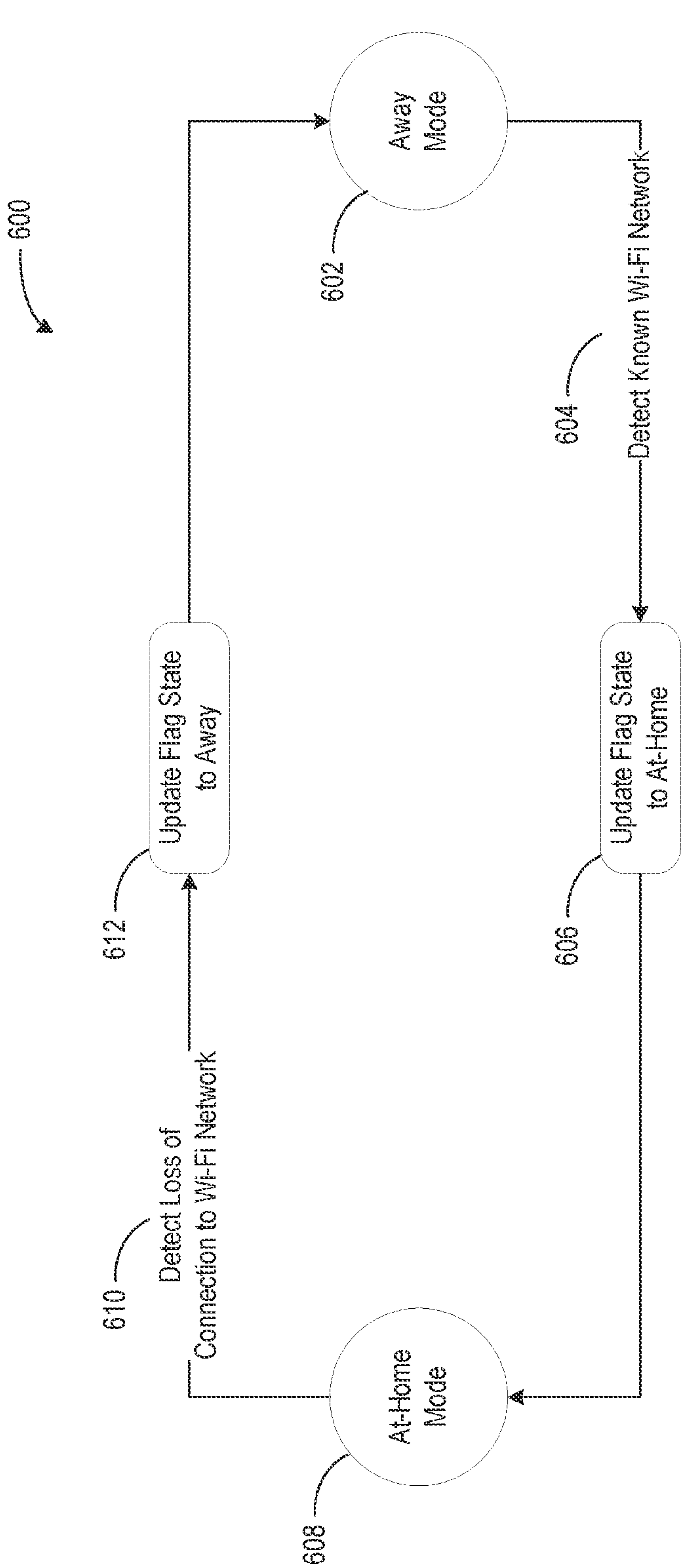
FIG. 6A is a state diagram of an example process flow of the disclosed techniques.
Figure 6B:
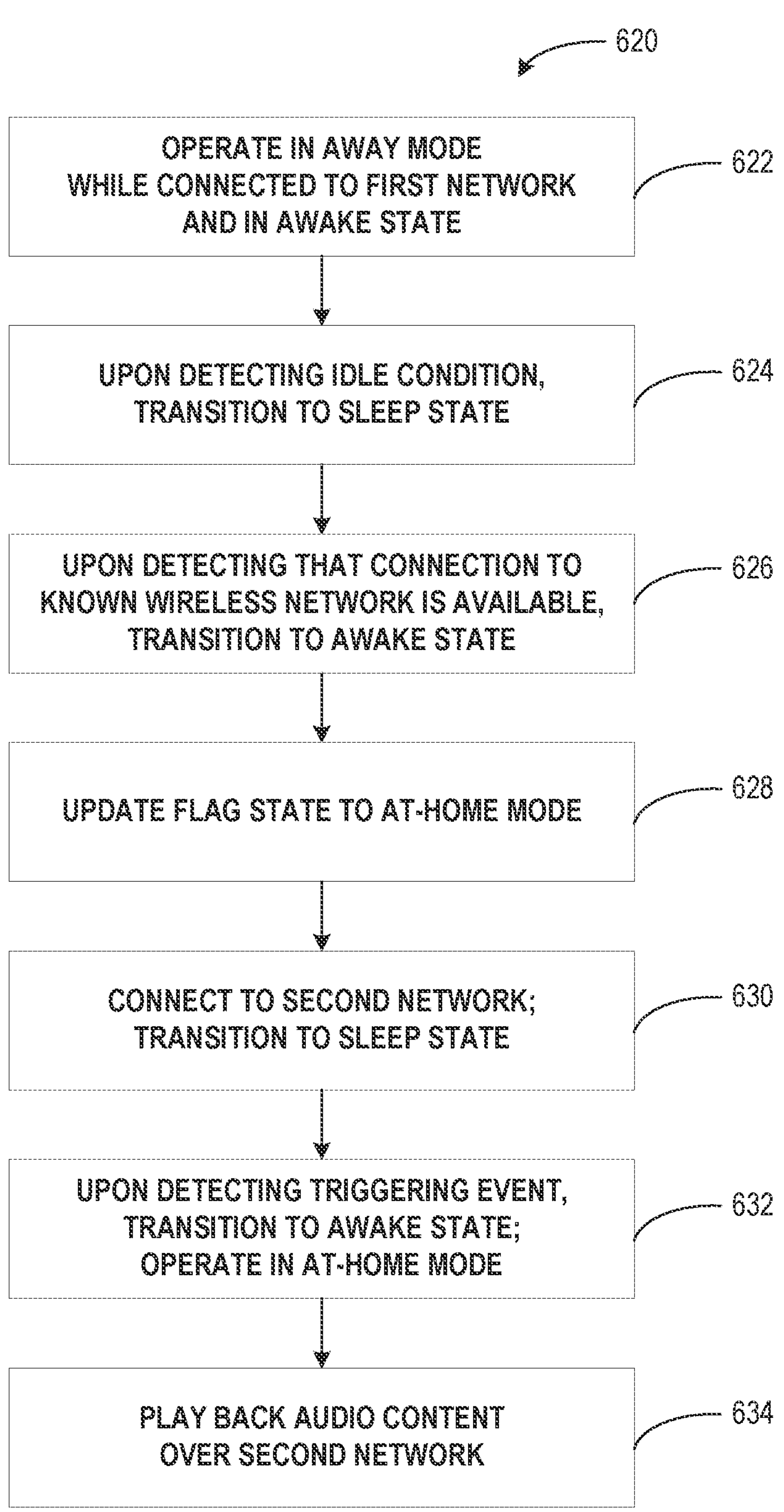
FIG. 6B is a flow diagram of one example process according to the disclosed techniques.
Figure 6C:
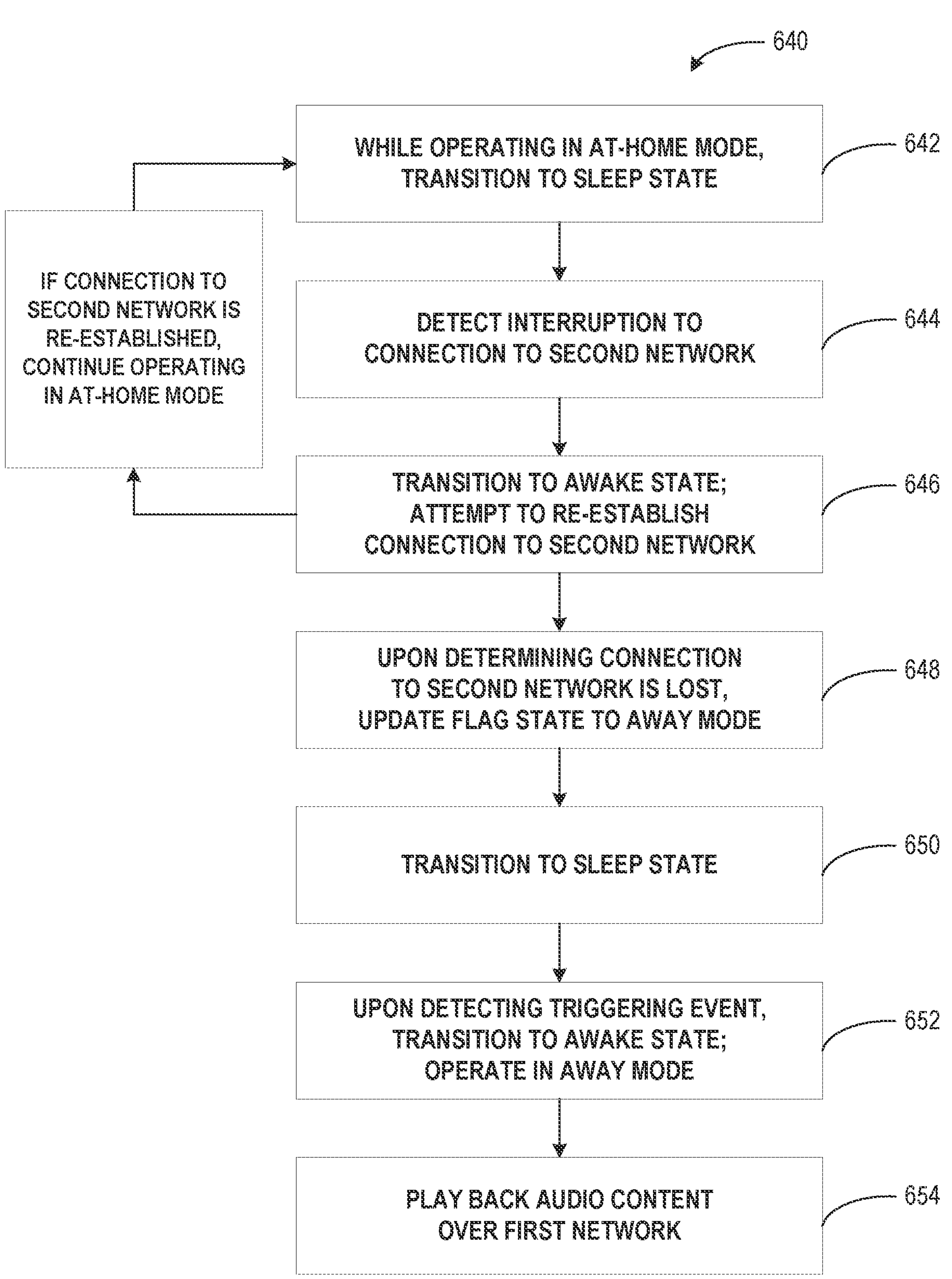
FIG. 6C is a flow diagram of another example process according to the disclosed techniques.

FIGS. 6A, 6B, and 6C together describe example processes which may be employed by the network interface components, processing components, and/or other components of a playback device (e.g., any of the playback devices and/or NMD's discussed herein) to intelligently determine and execute preferred networking behavior for transitioning from one mode of operation to another as described above.

FIG. 6A depicts an example cycle 600 of transitioning between modes of operation that may be implemented by a playback device, such as the playback device 110 described with respect to FIGS. 1A-3E and the playback device 500 described with respect to FIG. 5, wherein the playback device may detect a change to its networking environment and update a flag state to facilitate transition between different modes of operation.

The example cycle may begin at 602 when the playback device may be operating in an Away Mode by playing back audio content over a BLUETOOTH network. At 604, the playback device may detect that a known WIFI network is in range. Accordingly, at 606, the playback device may update the flag state (e.g., flag state variable 532) to At-Home. The process of transitioning from an Away Mode to an At-Home mode is described in greater detail below with reference to FIG. 6B. At 608, based on the flag state update at 606 indicating At-Home, the playback device may be operating in an At-Home Mode and play back audio content over the WIFI network. At 610, the device may detect a loss of connection to the WIFI network. Accordingly, at 612, the playback device may update the flag state to Away, indicating that the device should begin operating in an Away Mode. The process of transitioning from an At-Home Mode to an Away mode is described in greater detail below with reference to FIG. 6C. By updating the flag state based on detected changes to its networking environment, the playback device may determine appropriate networking behavior based on the flag state prior to receiving user input, which may result in an enhanced user experience by reducing lag time between a user issuing a command and the playback device processing the command.

FIG. 6B describes an example process 620 that may be implemented by a playback device, such as the playback device 110 described with respect to FIGS. 1A-3E and the playback device 500 described with respect to FIG. 5, for transitioning from an Away Mode to an At-Home mode as part of the example cycle 600 depicted in FIG. 6A.

Various embodiments of the example process 620 include one or more operations, functions, and actions illustrated by blocks 622 through 632. Although the blocks are illustrated in sequential order, some of these blocks may also be performed in parallel, and/or in a different order than the order disclosed and described herein. Also, the various blocks may be combined into fewer blocks, divided into additional blocks, and/or removed based upon a desired implementation.

The example process 620 may begin at block 622 while a playback device is operating in an Away Mode. While operating in the Away Mode, the device may be connected to at least one first wireless network, which may comprise one or more wireless PANs. For example, the playback device may connect to a BLUETOOTH network (e.g., a BLUETOOTH classic network or a BLE network) and communicate using the second network circuit 522 with a user device to receive user commands and accordingly play back audio content over the BLUETOOTH network. Alternatively, the playback device may connect simultaneously to a BLUETOOTH classic network and a BLE network, where the network interface components of the device may communicate with a user device (e.g., a control device such as a smartphone) to receive user commands over the BLE network and obtain and play back audio content over the BLUETOOTH classic network, thereby optimizing different communication channels for efficient power consumption, data transfer, and minimal lag time for executing a user command.

While the playback device is operating in an Away Mode and receiving and processing user commands (e.g., playing back audio content based on a user command) over the PAN(s), the playback device may be engaged in an awake power state. Accordingly, the processing components of the playback device may be in a high-powered state, as receiving commands from a user is either ongoing or likely.

The user device may include a graphical user interface, such as GUI 536, to facilitate operation of the playback device over the first wireless network. For instance, the GUI 536 may present a set of selectable commands for the playback device to perform (e.g., play audio content, skip to the next track, browse audio content, etc.). The set of commands and other options available to and/or selectable by the user via the GUI 536 may be specific to the mode of operation in which the device is currently engaged. For example, when a playback device is operating in an Away Mode, the user options available via the GUI 536 may be limited. In such instances, for example, the user may only see options relating to playing back and browsing certain audio content, and may not see and/or be able to select options that may be available when the playback device is operating in an At-Home Mode, such as grouping the playback device with one or more other devices or assigning the playback device to a particular listening zone.

Additionally, the playback device's own user interface (e.g. user interface 520) may provide feedback to the user indicating the current mode of operation. For example, while operating in the Away Mode and connected to one or more BLUETOOTH networks, the device may display one or more blue-colored LED lights via its user interface 520.

At block 624, the playback device may detect one or more conditions which indicate that the device is unlikely to continue receiving user commands. For example, the user may pause or cease audio playback on the user device, and the playback device may determine that after a threshold amount of time has passed without user interaction, a user command is unlikely to be received. Accordingly, the playback device may transition to a sleep power state, where one or more of the processing components may be put to sleep in order to reduce power consumption of the device as discussed above. As discussed above, the sleep state may be a light sleep state or a deep sleep state. Other examples of conditions that may indicate the device is unlikely to continue receiving user commands include user interaction with the device itself. For example, the user may press a physical button on the device, causing it to transition to the sleep state. Other examples are also possible.

At block 626, the playback device may detect that a connection to a second wireless network is available, which may cause the one or more processing components which were put to sleep at block 624 above to transition to an awake state. For example, the first network circuit 510 of the example playback device 500 may detect that it has entered the range of one or more known wireless LANs. In such an instance, the playback device may be a portable device (e.g., the headset of FIG. 4) which may recognize a user's home WIFI network upon the user bringing the device back home from an outside destination. Detecting that a connection to the known WIFI network is available may be based on a variety of indicators, one example of which may be recognizing the SSID of the known WIFI network. Techniques for waking up a playback device based on detecting a known SSID are discussed above and described in further detail in PCT Patent Publication No. WO/2020/150595 referenced above.

In some embodiments, the playback device may transition the one or more processing components which were put to sleep at block 624 into an awake state before searching for (and/or detecting the presence of) wireless LANs in block 626. For instance, the playback device may automatically transition the one or more processing components to an awake state to search for (and/or detect the presence of) wireless LANs when one or more of the following conditions arise: (1) detect receipt of power from an external source (e.g., the playback device is plugged into a power adapter or placed on a wireless charger); (2) detect activation of one or more user interface elements (e.g., buttons, switches, capacitive touch surfaces, etc.) are activated (e.g., by a user); (3) detect proximity to a stationary playback device (e.g., via detection of a radio frequency signal, such as a BLE beacon, and/or an acoustic signal, such as an ultrasonic signal, emitted by the stationary playback device); and/or (4) a certain amount of time has passed (e.g., the playback device has been asleep for an hour). In such instances, the playback device may automatically transition the one or more processing components back to a sleep state if no wireless LANs are detected (e.g., after performing a threshold number of searches and/or searching for a threshold amount of time). Otherwise, the playback device may maintain the one or more processing components in the awake state and continue to block 628.

At block 628, the playback device may update a flag state variable (e.g., flag state variable 532 of FIG. 5) to indicate an At-Home Mode. Thereafter, the flag state variable may be read by the network interface components and/or processing components upon a wake up command to determine appropriate networking and/or processing behaviors that correspond to the At-Home Mode. Such behaviors may include connecting to the user's home WIFI network in preparation for streaming audio content over the WIFI network, updating the user interface 520 to display white-colored LED lights, and/or transmitting an indication that causes the user device to update its GUI to display options associated with the At-Home Mode. Various other networking and/or processing behaviors associated with the At-Home Mode are also possible.

At block 630, the playback device may establish a connection to the at least one second wireless network. For example, the network interface components may connect to the user's home WIFI network so the playback device is prepared to receive user commands and obtain and play back audio content over the WIFI network. This may involve, for example, establishing a connection with the access point and/or router of the user's home WIFI network and transmitting an indication for the user device to update its GUI as discussed above. The playback device may then return the processing components to a sleep state, as discussed in block 624 above.

Advantageously, blocks 626-630 may be carried out by the playback device without user input. In this regard, these operations may be performed by the playback device in the background such that they are substantially invisible to the user. For instance, a user may return home carrying a portable playback device that is in a sleep state in a backpack or similar bag. The portable playback device may carry out the operations of blocks 626-630 while the user is entering their house and getting settled (e.g., unlocking the door, removing shoes, turning on lights, etc.). Thus, even if the user issues a command to the portable playback device relatively quickly after returning home (e.g., one minute after moving within range of the home WIFI network), the portable playback device may have already carried out the operations of blocks 626-630.

At block 632, while the playback device is in the sleep state, it may detect a triggering event indicating a user command, which may cause the one or more processing components to transition to an awake state. For example, the user may issue a command, via the GUI on a user device such as the user's smartphone, to play audio content, which may cause the user device to transmit a "wake-up" packet to the playback device. Accordingly, the processing components of the playback device may receive the wake-up packet and transition from the sleep state to the awake state in order to process the user command. As noted above, the GUI of the user device may have been updated in connection with blocks 626-630, based on an indication received from the playback device. Alternatively, the playback device may interact with the user device to update the GUI of the user device when the triggering event occurs.

As another example of a triggering event, the user may press a button on the playback device itself, causing the processing components to transition to the awake state to receive a user command. Other triggering events are also possible. Upon waking up, the playback device may read the value of the flag state variable and immediately begin to operate in the At-Home Mode by re-establishing the connection to the home WIFI network and updating the user interface 520 to indicate operation in the At-Home Mode. The playback device may then execute the user command. For instance, the playback device may, at block 634, play back audio content over the WIFI network.

Accordingly, the playback device may not only maintain reduced power consumption under conditions where the device is not in use or a user command is unlikely, but also improve its networking behavior by reducing the response time perceived by the user upon waking up the device in a new networking environment. Without the flag state variable to use as a reference upon receiving a wake up command, the playback device may otherwise attempt to re-establish a connection over the first wireless network (e.g., BLUETOOTH), which may result in a connection to an unintended network and require user intervention to properly configure the playback device's networking behavior. Additionally, or alternatively, the playback device may begin scanning for one or more known WLANs upon receiving the wake up command, identify and then connect to the home WIFI network, and then finally process the user command, resulting in a significant lag in response time perceived by the user.

FIG. 6C describes an example process 640 that may be implemented by a playback device, such as the playback device 110 described with respect to FIGS. 1A-3E and the playback device 500 described with respect to FIG. 5, for transitioning from an At-Home Mode to an Away Mode as part of the example cycle 600 depicted in FIG. 6A.

Various embodiments of the example process 640 include one or more operations, functions, and actions illustrated by blocks 642 through 652. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

The example process 640 may begin at block 642, where the playback device may be operating in the At-Home Mode as described above. While operating in the At-Home Mode, the playback device may transition to a sleep state, based on a period of inactivity or a user command, among other possibilities.

At block 644, while in the sleep state, the playback device may detect, via the first network circuit 510, an interruption to the connection to the WLAN. In such an instance, the network interface components may attempt to verify if the connection to the WLAN has been lost only momentarily and the playback device should continue operating in At-Home Mode, or if the connection has been lost such that a flag state update is appropriate. For example, the WLAN's router or access point may be experiencing technical issues requiring a reboot, which may interrupt the WLAN connection temporarily. As another example, the playback device may be a portable (e.g., wearable) device such as the headset of FIG. 4, and the user may temporarily walk into an area with weak wireless signal capability, where the playback device is able to determine that the WLAN access point is within range, but the signal is not strong enough to establish a connection. In such instances, a flag state update would not be appropriate, as the playback device is remaining within the user's home environment and will continue to operate in At-Home Mode upon reconnecting to the WLAN (e.g., after the router reboots, after user walks back to area with sufficient signal strength, etc.).

Accordingly, at block 646, the playback device may transition to the awake state and the network interface components of the playback device may attempt to re-establish the connection to the WLAN. The playback device may attempt to re-establish the WLAN connection for a predetermined threshold amount of time, which may be between 10-30 seconds, among other possibilities. For example, if the connection was interrupted due to a router reboot, the playback device may successfully re-establish the connection to the WLAN relatively quickly (e.g., within a few seconds) after the router has rebooted. In the example where the playback device is a portable (e.g., wearable) device and the connection to the WLAN was interrupted due to the user temporarily walking into an area with a weak wireless signal, the playback device may successfully re-establish the connection to the WLAN after the user has walked back into an area with sufficient signal strength. If the connection to the WLAN is able to be re-established within the predetermined threshold amount of time, the playback device may leave the flag state unchanged and continue operating in an At-Home Mode until another interruption is detected.

However, if the connection to the WLAN is unable to be re-established within the predetermined threshold amount of time (e.g., the user has left the house with the portable device), the playback device may determine that the connection has been lost such that a flag state update is appropriate. Accordingly, at block 648, the device may, upon determining that the connection to the WLAN has been lost, update the flag state to Away, indicating the device should operate in an Away Mode.

Subsequently at block 650, the playback device may transition back to a sleep state in order to conserve power, as discussed in the examples above.

At block 652, while the playback device is in the sleep state, the device may detect a triggering event causing it to transition to an awake state. As discussed above, the triggering event may be caused by a user input, such as a button press on the playback device. Based on the triggering event, the playback device may wake up, read the value of the flag state variable 532, and immediately begin operating in the Away Mode, as discussed above. For example, the playback device may immediately enter a BLUETOOTH pairing mode and attempt to connect with one or more previously paired devices, such as the user device, such that the playback device is ready to receive and execute commands relatively quickly. In particular, because the networking behavior of the playback device is established at wake-up based on the flag state variable 532, the playback device may forego attempts to search for and/or connect to available WIFI networks, which may otherwise delay the time until the playback device is ready to receive commands over the PAN.

At block 654, the playback device may receive a command from the user device to play back audio content over the PAN. Accordingly, the playback device may proceed to play back the audio content.

For the example processes described with reference to FIGS. 6A-6C, and other processes and methods disclosed herein, the diagrams and flowcharts show functionality and operation of one possible implementation of some embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable media, for example, such as tangible, non-transitory computer-readable media that stores data for short periods of time like register memory, processor cache, and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the example processes 620 and 640 and other processes and methods disclosed herein, each block in FIGS. 6B-6C may represent circuitry that is wired to perform the specific logical functions in the process.

It should be appreciated that the techniques described herein with reference to awake and sleep power states may be readily applied to any of a variety of device states with differing power consumption (e.g., a higher power consumption state, such as the awake state, and a lower power consumption state, such as the sleep state). An additional example of a set of higher and lower power consumption states include an active state (where the device consumes more power) and an idle state (where the device consumes less power). An active state may include, for example, a state where the device is performing at least one operation associated with a user command (e.g., playing back audio). An idle state may include, for example, a state where the device is not performing an operation associated with a user command (e.g., sitting unused on a table).

III. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Further, the examples described herein may be employed in systems separate and apart from media playback systems such as any Internet of Things (IoT) system comprising an IoT device. An IoT device may be, for example, a device designed to perform one or more specific tasks (e.g., making coffee, reheating food, locking a door, providing power to another device, playing music) based on information received via a network (e.g., a WAN such as the Internet). Example IoT devices include a smart thermostat, a smart doorbell, a smart lock (e.g., a smart door lock), a smart outlet, a smart light, a smart vacuum, a smart camera, a smart television, a smart kitchen appliance (e.g., a smart oven, a smart coffee maker, a smart microwave, and a smart refrigerator), a smart home fixture (e.g., a smart faucet, a smart showerhead, smart blinds, and a smart toilet), and a smart speaker (including the network accessible and/or voice-enabled playback devices described above). These IoT systems may also comprise one or more devices that communicate with the IoT device via one or more networks such as one or more cloud servers (e.g., that communicate with the IoT device over a WAN) and/or one or more computing devices (e.g., that communicate with the IoT device over a LAN and/or a PAN). Thus, the examples described herein are not limited to media playback systems.

It should be appreciated that references to transmitting information to particular components, devices, and/or systems herein should be understood to include transmitting information (e.g., messages, requests, responses) indirectly or directly to the particular components, devices, and/or systems. Thus, the information being transmitted to the particular components, devices, and/or systems may pass through any number of intermediary components, devices, and/or systems prior to reaching its destination. For example, a control device may transmit information to a playback device by first transmitting the information to a computing system that, in turn, transmits the information to the playback device. Further, modifications may be made to the information by the intermediary components, devices, and/or systems. For example, intermediary components, devices, and/or systems may modify a portion of the information, reformat the information, and/or incorporate additional information.

Similarly, references to receiving information from particular components, devices, and/or systems herein should be understood to include receiving information (e.g., messages, requests, responses) indirectly or directly from the particular components, devices, and/or systems. Thus, the information being received from the particular components, devices, and/or systems may pass through any number of intermediary components, devices, and/or systems prior to being received. For example, a control device may receive information from a playback device indirectly by receiving information from a cloud server that originated from the playback device. Further, modifications may be made to the information by the intermediary components, devices, and/or systems. For example, intermediary components, devices, and/or systems may modify a portion of the information, reformat the information, and/or incorporate additional information.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

Example Features (Feature 1) A playback device comprising: at least one communication interface configured to facilitate communication over a plurality of wireless networks; at least one processor; at least one non-transitory computer-readable medium; and program instructions stored on the at least one non-transitory computer-readable medium that are executable by the at least one processor such that the playback device is configured to: operate in a first mode of operation in which the playback device is configured to: (i) while the playback device is in a first power state and connected to at least one first wireless network, play back first audio content received via the at least one first wireless network from a user device, and (ii) transition from the first power state to a second power state where the playback device consumes less power than in the first power state; while operating in the first mode of operation and in the second power state, detect that a connection to at least one second wireless network is available; based on detecting that the connection to the at least one second wireless network is available, (i) transition from the second power state to the first power state; (ii) establish a connection to one of the at least one second wireless network; (iii) update at least one state variable indicative of a selected mode of operation; and (iv) after establishing the connection to the one of the at least one second wireless network, transition from the first power state to the second power state; after updating the at least one state variable and while the playback device is in the second power state, detect a triggering event indicative of a user input; and based on the triggering event and the updated at least one state variable, (i) transition from the second power state to the first power state and (ii) begin to operate in the second mode of operation in which the playback device is configured to, while the playback device is in the first power state and connected to the one of the at least one second wireless network, play back second audio content received via the one of the at least one second network from at least one remote server.

(Feature 2) The playback device of feature 1, wherein the at least one first wireless network comprises a Personal Area Network (PAN), and wherein the at least one second wireless network comprises a Wireless Local Area Network (WLAN).

(Feature 3) The playback device of feature 1, wherein the first power state is an awake state and the second power state is a sleep state.

(Feature 4) The playback device of feature 1, wherein the first power state is an active state and wherein the second power state is an idle state.

(Feature 5) The playback device of feature 1, wherein the triggering event is a first triggering event, the playback device further having program instructions that are executable by the at least one processor such that the playback device is configured to: while operating in the second mode, transition to the second power state; while operating in the second mode and in the second power state, detect that the connection to the one of the at least one second wireless network has been lost;

based on detecting that the connection to the second wireless network has been lost, (i) transition from the second power state to the first power state, (ii) update the at least one state variable, and (iii) transition from the first power state to the second power state; detect a second triggering event; and based on the second triggering event and the updated at least one state variable, (i) transition from the second power state to the first power state and (ii) begin to operate in the first mode of operation.

(Feature 6) The playback device of feature 5, wherein detecting that the connection to the one of the at least one second wireless network has been lost comprises: detecting an interruption to the connection to the one of the at least one second wireless network; attempting to reestablish the connection with the one of the at least one second wireless network; and after attempting to reestablish the connection for a predetermined period of time, determining that the connection to the one of the at least one second wireless network has been lost.

(Feature 7) The playback device of feature 1, wherein the playback device further comprises a user interface, the playback device further having program instructions that are executable by the at least one processor such that the playback device is configured to: update the user interface by providing a first visual feedback indicating the first mode of operation when the playback device begins operating in the first mode of operation; and update the user interface by providing a second visual feedback indicating the second mode of operation when the playback device begins operating in the second mode of operation.

(Feature 8) The playback device of feature 1, the playback device further having program instructions that are executable by the at least one processor such that the playback device is configured to: based on (i) establishing a connection to the one of the at least one second wireless network and (ii) updating the at least one state variable, cause the user device to update a graphical user interface (GUI) to provide a set of selectable user control options associated with the second mode of operation.

(Feature 9) The playback device of feature 1, the playback device further having program instructions that are executable by the at least one processor such that the playback device is configured to interact with the controller to: based on the triggering event, update a graphical user interface (GUI) to provide a set of selectable user control options associated with the second mode of operation.

(Feature 10) The playback device of feature 1, wherein the program instructions that are executable by the at least one processor such that the playback device is configured to detect a triggering event indicative of a user input comprise program instructions that are executable by the at least one processor such that the playback device is configured to: receive, from the user device, via the one of the at least one second wireless network, a command to transition from the second power state to the first power state.

(Feature 11) The playback device of feature 1 wherein the playback device is a battery-powered portable playback device.

(Feature 12) The playback device of feature 11, wherein the playback device is a wearable device.

(Feature 13) A non-transitory computer-readable medium comprising program instructions stored thereon that are executable by at least one processor such that a playback device is configured to: operate in a first mode of operation in which the playback device is configured to: (i) while the playback device is in a first power state and connected to at least one first wireless network, play back first audio content received via the at least one first wireless network from a user device, and (ii) transition from the first power state to a second power state where the playback device consumes less power than in the first power state; while operating in the first mode of operation and in the second power state, detect that a connection to at least one second wireless network is available; based on detecting that the connection to the at least one second wireless network is available, (i) transition from the second power state to the first power state; (ii) establish a connection to one of the at least one second wireless network; (iii) update at least one state variable indicative of a selected mode of operation; and (iv) after establishing the connection to the one of the at least one second wireless network, transition from the first power state to the second power state; after updating the at least one state variable and while the playback device is in the second power state, detect a triggering event indicative of a user input; and based on the triggering event and the updated at least one state variable, (i) transition from the second power state to the first power state and (ii) begin to operate in the second mode of operation in which the playback device is configured to, while the playback device is in the first power state and connected to the one of the at least one second wireless network, play back second audio content received via the one of the at least one second network from at least one remote server.

(Feature 14) The computer-readable medium of feature 13, wherein the at least one first wireless network comprises a Personal Area Network (PAN), and wherein the at least one second wireless network comprises a Wireless Local Area Network (WLAN).

(Feature 15) The computer-readable medium of feature 13, wherein the triggering event is a first triggering event, the computer-readable medium further comprising program instructions stored thereon that are executable by at least one processor such that the playback device is configured to: while operating in the second mode, transition to the second power state; while operating in the second mode and in the second power state, detect that the connection to the one of the at least one second wireless network has been lost; based on detecting that the connection to the second wireless network has been lost, (i) transition from the second power state to the first power state, (ii) update the at least one state variable, and (iii) transition from the first power state to the second power state; detect a second triggering event; and based on the second triggering event and the updated at least one state variable, (i) transition from the second power state to the first power state and (ii) begin to operate in the first mode of operation.

(Feature 16) The computer-readable medium of feature 15, wherein detecting that the connection to the one of the at least one second wireless network has been lost comprises: detecting an interruption to the connection to the one of the at least one second wireless network; attempting to reestablish the connection with the one of the at least one second wireless network; and after attempting to reestablish the connection for a predetermined period of time, determining that the connection to the one of the at least one second wireless network has been lost.

(Feature 17) The computer-readable medium of feature 13, wherein the playback device further comprises a user interface, the computer-readable medium further comprising program instructions stored thereon that are executable by at least one processor such that the playback device is configured to: update the user interface by providing a first visual feedback indicating the first mode of operation when the playback device begins operating in the first mode of operation; and update the user interface by providing a second visual feedback indicating the second mode of operation when the playback device begins operating in the second mode of operation.

(Feature 18) The computer-readable medium of feature 13, further comprising program instructions stored thereon that are executable by at least one processor such that the playback device is configured to: based on (i) establishing a connection to the one of the at least one second wireless network and (ii) updating the at least one state variable, cause the user device to update a graphical user interface (GUI) to provide a set of selectable user control options associated with the second mode of operation.

(Feature 19) The computer-readable medium of feature 13, further comprising program instructions stored thereon that are executable by at least one processor such that the playback device is configured to: based on the triggering event, update a graphical user interface (GUI) to provide a set of selectable user control options associated with the second mode of operation.

(Feature 20) A method comprising: operating in a first mode of operation in which a playback device is configured to: (i) while the playback device is in a first power state and connected to at least one first wireless network, play back first audio content received via the at least one first wireless network from a user device, and (ii) transition from the first power state to a second power state where the playback device consumes less power than in the first power state; while operating in the first mode of operation and in the second power state, detecting that a connection to at least one second wireless network is available; based on detecting that the connection to the at least one second wireless network is available, (i) transitioning from the second power state to the first power state; (ii) establishing a connection to one of the at least one second wireless network; (iii) updating at least one state variable indicative of a selected mode of operation; and (iv) after establishing the connection to the one of the at least one second wireless network, transitioning from the first power state to the second power state; after updating the at least one state variable and while the playback device is in the second power state, detecting a triggering event indicative of a user input; and based on the triggering event and the updated at least one state variable, (i) transitioning from the second power state to the first power state and (ii) beginning to operate in the second mode of operation in which the playback device is configured to, while the playback device is in the first power state and connected to the one of the at least one second wireless network, play back second audio content received via the one of the at least one second network from at least one remote server.

(Feature 21) A playback device comprising: one or more processing components configured to operate in first and second power states, wherein, in the second power state, the one or more processing components consume less power than in the first power state; at least one non-transitory computer-readable medium; and one or more network interface components configured for facilitating communication over a plurality of wireless networks; and wherein the one or more processing components are configured for: (i) after receiving an indication that the presence of one or more first wireless networks is detected while the one or more processing components are in the second power state, transitioning from the second power state to the first power state; (ii) updating, while in the first power state, a state variable from a first value indicating that a connection via at least one of one or more second wireless networks should be established to a second value indicating that a connection via at least one of the one or more first wireless networks should be established; and (iii) after updating the state variable, entering the second power state.

(Feature 22) The playback device of feature 21, further configured for: detecting, while the one or more processing components are in the second power state, a triggering event which causes the one or more processing components to transition to the first power state; and after entering the first power state, based on the state variable having the second value, operating in a first mode in which the playback device is configured to establish a connection via the at least one of the first one more wireless networks.

(Feature 23) The playback device of any of features 21 to 22, further configured for, before detection of the presence of the one or more first wireless networks: operating in a second mode in which the playback device is configured to play back audio content received via the at least one of one or more second wireless networks from a user device while the one or more processing components are in the first power state, wherein, while operating in the second mode, the state variable indicates connection to one or more second wireless networks.

(Feature 24) The playback device of feature 23, further configured for, while operating in the second mode, causing the one or more processing components to transition to the second power state.

(Feature 25) The playback device of any of features 21 to 24, further configured for, after receiving the indication that one or more first wireless networks has been detected, connecting to at least one of the one or more first wireless networks.

(Feature 26) The playback device of feature 25, wherein connecting to the at least one of the one or more first wireless networks comprises at least one of: establishing a connection with an access point, or transmitting an indication to a control device to update its interface.

(Feature 27) The playback device of feature 22 in combination with any preceding feature, wherein, in the first mode, the playback device is configured to play back second audio content received via the at least one of one or more second wireless networks from at least one remote server.

(Feature 28) The playback device of any of features 21 to 27, wherein the at least one of one or more first wireless networks comprises a Personal Area Network (PAN), and wherein the at least one of one or more second wireless network comprises a Wireless Local Area Network (WLAN).

(Feature 29) The playback device of any of features 21 to 28, wherein the first power state is an awake state, and wherein the second power state is a sleep state.

(Feature 30) The playback device of any of features 21 to 29, wherein the first power state is an active state, and wherein the second power state is an idle state.

(Feature 31) The playback device of features 22 or 23 in combination with any of features 21 to 30, wherein: the triggering event is a first triggering event, and the playback device is further configured for: (i) while operating in the second mode, transitioning to the second power state; (ii) when connection to the at least one of one or more second wireless networks has been lost while the playback device is operating in the second mode and in the second power state: (a) updating the state variable to indicate that connection via the one or more first wireless networks should be established; and (b) transitioning from the first power state to the second power state; and (iii) after detecting a second triggering event, based on the updated state variable, transitioning from the second power state to the first power state and operate in the first mode of operation.

(Feature 32) The playback device of feature 31, wherein detecting that the connection to the at least one second wireless network has been lost comprises: detecting an interruption to the connection to the at least one of one or more second wireless networks; attempting to reestablish the connection with the least one of one or more second wireless networks; and after attempting to reestablish the connection for a predetermined period of time, determining that the connection to the at least one of one or more second wireless networks has been lost.

(Feature 33) The playback device of any of features 21 to 32, wherein the playback device further comprises a user interface (520, 536) and is further configured for: updating the user interface by providing a first visual feedback indicating the first mode of operation when the playback device begins operating in the first mode of operation; and updating the user interface by providing a second visual feedback indicating the second mode of operation when the playback device begins operating in the second mode of operation.

(Feature 34) The playback device of any of features 21 to 33, further configured for: when a connection to the at least one of one or more second wireless networks is established and the state variable is updated to the second value, causing the user device to update a graphical user interface (GUI) to provide a set of selectable user control options associated with the second mode of operation.

(Feature 35) The playback device of any of features 21 to 34, further configured for interacting with the user device to: based on the triggering event, update a graphical user interface (GUI) to provide a set of selectable user control options associated with the second mode of operation.

(Feature 36) The playback device of any of features 21 to 35, wherein detecting a triggering event comprises receiving, from the user device, via the at least one of one or more second wireless networks, a command to transition from the second power state to the first power state.

(Feature 37) The playback device of any of features 21 to 36, wherein the playback device is a least one of: a portable battery-powered playback device, or a wearable device.

(Feature 38) The playback device of any of features 21 to 37, wherein the one or more network interface components are further configured for: detecting, while the one or more processing components are in the second power state, the presence of one or more wireless networks; and sending a signal to the one or more processing components indicating that the presence of one or more wireless networks has been detected.

(Feature 39) A method for a playback device comprising one or more processing components (504) having a first power state and a second power state, the method comprising: (i) after receiving an indication that the presence of one or more first wireless networks has been detected, while the one or more processing components are in the second power state, transitioning, by the one or more processing components, from the second power state to the first power state, wherein, in the second power state, the one or more processing components consume less power than in the first power state; (ii) updating, while in the first power state, a state variable from a first value indicating that connection via at least one of one or more second wireless networks should be established to a second value indicating that connection via at least one of the one or more first wireless networks should be established; and (iii) after updating the state variable, entering the second power state.

(Feature 40) The method of feature 39, further comprising: detecting, while the one or more processing components are in the second power state, a triggering event which causes the one or more processing components to transition to the first power state; and after entering the first power state, based on the state variable having the second value, operating in a first mode in which the playback device is configured to establish a connection via the at least one of the one more first wireless networks.

(Feature 41) The method of one of features 39 or 40, further comprising, before detection of the presence of the one or more first wireless networks: operating in a second mode in which the playback device is configured to play back audio content received via the at least one of one or more second wireless networks from a user device while the one or more processing components are in the first power state, wherein, while operating in the second mode, the state variable indicates connection to one or more second wireless networks.

(Feature 42) The method of feature 41, further comprising, while operating in the second mode, causing the one or more processing components to transition to the second power state.

(Feature 43) The method of one of features 39 to 42, further comprising, after detection of the presence of the one or more first wireless networks, connecting to at least one of the one or more first wireless networks.

(Feature 44) The method of feature 43, wherein connecting to the at least one of the one or more first wireless networks comprises at least one of: establishing a connection with an access point, or transmitting an indication to a control device to update its interface.

(Feature 45) The method of feature 40 in combination with any of features 39 to 44, wherein, in the first mode, the playback device is configured to play back second audio content received via the at least one of one or more second wireless networks from at least one remote server.

(Feature 46) The method of one of features 39 to 45, wherein the at least one of the one or more first wireless networks comprises a Personal Area Network (PAN), and wherein the at least one of one or more second wireless networks comprises a Wireless Local Area Network (WLAN).

(Feature 47) The method of one of features 39 to 46, wherein the first power state is an awake state, and wherein the second power state is a sleep state.

(Feature 48) The method of one of features 39 to 47, wherein the first power state is an active state, and wherein the second power state is an idle state.

(Feature 49) The method of features 40 and 41, wherein: the triggering event is a first triggering event, and the playback device is configured to: (i) while operating in the second mode, transition to the second power state; (ii) when connection to the at least one of one or more second wireless networks has been lost while the playback device is operating in the second mode and in the second power state: (a) update the state variable to indicate that connection via the one or more first wireless networks should be established; and (b) transition from the first power state to the second power state; and (iii) after detecting a second triggering event, based on the updated state variable, transition from the second power state to the first power state and operate in the first mode of operation.

(Feature 50) The method of feature 49, wherein detecting that the connection to the at least one of one or more second wireless networks has been lost comprises: detecting an interruption to the connection to the at least one of one or more second wireless networks; attempting to reestablish the connection with the at least one of one or more second wireless networks; and after the attempt to reestablish the connection for a predetermined period of time, determining that the connection to the at least one of one or more second wireless networks has been lost.

(Feature 51) The method of one of features 39 to 50, wherein the playback device further comprises a user interface (520, 536) and is further configured to: update the user interface by providing a first visual feedback indicating the first mode of operation when the playback device begins operating in the first mode; and update the user interface by providing a second visual feedback indicating the second mode of operation when the playback device begins operating in the second mode of operation.

(Feature 52) The method of one of features 41 to 51, further comprising: when a connection to the at least one of one or more second wireless networks is established and the state variable is updated to the second value, causing the user device to update a graphical user interface (GUI) to provide a set of selectable user control options associated with the second mode of operation.

(Feature 53) The method of one of features 41 to 52, further comprising: based on the triggering event, causing the user device to update a graphical user interface (GUI) to provide a set of selectable user control options associated with the second mode of operation.

(Feature 54) The method of one of features 40 to 53, wherein detecting a triggering event comprises receiving, from a user device, via the at least one of one or more second wireless networks, a command to transition from the second power state to the first power state.

(Feature 55) The method of one of features 39 to 54, wherein the playback device is a portable battery-powered playback device.

(Feature 56) The method of one of features 39 to 55, wherein the playback device is a wearable device.

(Feature 57) A non-transitory computer-readable medium comprising program instructions stored thereon that are executable by at least one processor such that a playback device is configured to perform the method of one of features 39 to 56.

The invention claimed is:

1. A playback device comprising:

at least one communication interface configured to facilitate communication over a plurality of wireless networks;

at least one processor;

at least one non-transitory computer-readable medium; and program instructions stored on the at least one non-transitory computer-readable medium that are executable by the at least one processor such that the playback device is configured to:

operate in a first mode of operation in which the playback device is configured to: (i) while the playback device is in a first power state and connected to at least one first wireless network, play back first audio content received via at least one first wireless network from a user device, (ii) transition between the first power state and a second power state where the playback device consumes less power than in the first power state, and (iii) store a first value for at least one state variable that indicates the playback device will operate in the first mode of operation upon detecting a triggering event indicative of a user input while the playback device is in the second power state;

while operating in the first mode of operation, detect that a connection to at least one second wireless network is available;

based on detecting that the connection to the at least one second wireless network is available, (i) while in the first power state, establish a connection to one of the at least one second wireless network; (ii) update the at least one state variable to a second value that indicates the playback device will operate in a second mode of operation upon detecting a triggering event indicative of a user input while the playback device is in the second power state; and (iii) after establishing the connection to the one of the at least one second wireless network, transition from the first power state to the second power state;

after updating the at least one state variable and while the playback device is in the second power state, detect a triggering event indicative of a given user input; and based on the triggering event indicative of the given user input and the updated at least one state variable, (i) transition from the second power state to the first power state and (ii) begin to operate in the second mode of operation in which the playback device is configured to, while the playback device is in the first power state and connected to the one of the at least one second wireless network, play back second audio content received via the one of the at least one second wireless network from at least one remote server.

2. The playback device of claim 1, wherein the at least one first wireless network comprises a Personal Area Network (PAN), and wherein the at least one second wireless network comprises a Wireless Local Area Network (WLAN).

3. The playback device of claim 1, wherein the first power state is an awake state and the second power state is a sleep state.

4. The playback device of claim 1, wherein the first power state is an active state and wherein the second power state is an idle state.

5. The playback device of claim 1, wherein the triggering event indicative of the given user input is a first triggering event indicative of a first given user input, the playback device further having program instructions that are executable by the at least one processor such that the playback device is configured to:

while operating in the second mode, transition to the second power state;

while operating in the second mode and in the second power state, detect that the connection to the one of the at least one second wireless network has been lost;

based on detecting that the connection to the second wireless network has been lost, (i) transition from the second power state to the first power state, (ii) update the at least one state variable, and (iii) transition from the first power state to the second power state;

detect a second triggering event indicative of a second given user input; and based on the second triggering event indicative of the second given user input and the updated at least one state variable, (i) transition from the second power state to the first power state and (ii) begin to operate in the first mode of operation.

6. The playback device of claim 5, wherein the program instructions that are executable by the at least one processor such that the playback device is configured to detect that the connection to the one of the at least one second wireless network has been lost comprise program instructions that are executable by the at least one processor such that the playback device is configured to:

detect an interruption to the connection to the one of the at least one second wireless network;

attempt to reestablish the connection with the one of the at least one second wireless network; and after attempting to reestablish the connection for a predetermined period of time, determine that the connection to the one of the at least one second wireless network has been lost.

7. The playback device of claim 1, wherein the playback device further comprises a user interface, the playback device further having program instructions that are executable by the at least one processor such that the playback device is configured to:

update the user interface by providing a first visual feedback indicating the first mode of operation when the playback device begins operating in the first mode of operation; and update the user interface by providing a second visual feedback indicating the second mode of operation when the playback device begins operating in the second mode of operation.

8. The playback device of claim 1, the playback device further having program instructions that are executable by the at least one processor such that the playback device is configured to:

based on (i) establishing a connection to the one of the at least one second wireless network and (ii) updating the at least one state variable, cause the user device to update a graphical user interface (GUI) to provide a set of selectable user control options associated with the second mode of operation.

9. The playback device of claim 1, the playback device further having program instructions that are executable by the at least one processor such that the playback device is configured to:

based on the triggering event indicative of the given user input, cause the user device to update a graphical user interface (GUI) to provide a set of selectable user control options associated with the second mode of operation.

10. The playback device of claim 1, wherein the program instructions that are executable by the at least one processor such that the playback device is configured to detect the triggering event indicative of the given user input comprise program instructions that are executable by the at least one processor such that the playback device is configured to:

receive, from the user device, via the one of the at least one second wireless network, a command to transition from the second power state to the first power state.

11. The playback device of claim 1, wherein the playback device is a battery-powered portable playback device.

12. The playback device of claim 11, wherein the playback device is a wearable device.

13. A non-transitory computer-readable medium comprising program instructions stored thereon that are executable by at least one processor such that a playback device is configured to:

operate in a first mode of operation in which the playback device is configured to: (i) while the playback device is in a first power state and connected to at least one first wireless network, play back first audio content received via at least one first wireless network from a user device, (ii) transition between the first power state and a second power state where the playback device consumes less power than in the first power state, and (iii) store a first value for at least one state variable that indicates the playback device will operate in the first mode of operation upon detecting a triggering event indicative of a user input while the playback device is in the second power state;

while operating in the first mode of operation, detect that a connection to at least one second wireless network is available;

based on detecting that the connection to the at least one second wireless network is available, (i) while in the first power state, establish a connection to one of the at least one second wireless network; (ii) update the at least one state variable to a second value that indicates the playback device will operate in a second mode of operation upon detecting a triggering event indicative of a user input while the playback device is in the second power state; and (iii) after establishing the connection to the one of the at least one second wireless network, transition from the first power state to the second power state;

after updating the at least one state variable and while the playback device is in the second power state, detect a triggering event indicative of a given user input; and based on the triggering event indicative of the given user input and the updated at least one state variable, (i) transition from the second power state to the first power state and (ii) begin to operate in the second mode of operation in which the playback device is configured to, while the playback device is in the first power state and connected to the one of the at least one second wireless network, play back second audio content received via the one of the at least one second wireless network from at least one remote server.

14. The non-transitory computer-readable medium of claim 13, wherein the at least one first wireless network comprises a Personal Area Network (PAN), and wherein the at least one second wireless network comprises a Wireless Local Area Network (WLAN).

15. The non-transitory computer-readable medium of claim 13, wherein the triggering event indicative of the given user input is a first triggering event indicative of a first given user input, the non-transitory computer-readable medium further comprising program instructions stored thereon that are executable by at least one processor such that the playback device is configured to:

while operating in the second mode, transition to the second power state;

while operating in the second mode and in the second power state, detect that the connection to the one of the at least one second wireless network has been lost;

based on detecting that the connection to the second wireless network has been lost, (i) transition from the second power state to the first power state, (ii) update the at least one state variable, and (iii) transition from the first power state to the second power state;

detect a second triggering event indicative of a second given user input; and based on the second triggering event indicative of the second given user input and the updated at least one state variable, (i) transition from the second power state to the first power state and (ii) begin to operate in the first mode of operation.

16. The non-transitory computer-readable medium of claim 15, wherein detecting that the connection to the one of the at least one second wireless network has been lost comprises:

detecting an interruption to the connection to the one of the at least one second wireless network;

attempting to reestablish the connection with the one of the at least one second wireless network; and after attempting to reestablish the connection for a predetermined period of time, determining that the connection to the one of the at least one second wireless network has been lost.

17. The non-transitory computer-readable medium of claim 13, wherein the playback device further comprises a user interface, the non-transitory computer-readable medium further comprising program instructions stored thereon that are executable by at least one processor such that the playback device is configured to:

update the user interface by providing a first visual feedback indicating the first mode of operation when the playback device begins operating in the first mode of operation; and update the user interface by providing a second visual feedback indicating the second mode of operation when the playback device begins operating in the second mode of operation.

18. The non-transitory computer-readable medium of claim 13, further comprising program instructions stored thereon that are executable by at least one processor such that the playback device is configured to:

based on (i) establishing a connection to the one of the at least one second wireless network and (ii) updating the at least one state variable, cause the user device to update a graphical user interface (GUI) to provide a set of selectable user control options associated with the second mode of operation.

19. The non-transitory computer-readable medium of claim 13, further comprising program instructions stored thereon that are executable by at least one processor such that the playback device is configured to:

based on the triggering event indicative of the given user input, cause the user device to update a graphical user interface (GUI) to provide a set of selectable user control options associated with the second mode of operation.

20. A method carried out by a playback device, the method comprising:

operating in a first mode of operation in which the playback device is configured to: (i) while the playback device is in a first power state and connected to at least one first wireless network, play back first audio content received via at least one first wireless network from a user device, (ii) transition between the first power state and a second power state where the playback device consumes less power than in the first power state, and (iii) store a first value for at least one state variable that indicates the playback device will operate in the first mode of operation upon detecting a triggering event indicative of a user input while the playback device is in the second power state;

while operating in the first mode of operation, detecting that a connection to at least one second wireless network is available;

based on detecting that the connection to the at least one second wireless network is available, (i) while in the first power state, establishing a connection to one of the at least one second wireless network; (ii) updating the at least one state variable to a second value that indicates the playback device will operate in a second mode of operation upon detecting a triggering event indicative of a user input while the playback device is in the second power state; and (iii) after establishing the connection to the one of the at least one second wireless network, transitioning from the first power state to the second power state;

after updating the at least one state variable and while the playback device is in the second power state, detecting a triggering event indicative of a given user input; and based on the triggering event indicative of the given user input and the updated at least one state variable, (i) transitioning from the second power state to the first power state and (ii) beginning to operate in the second mode of operation in which the playback device is configured to, while the playback device is in the first power state and connected to the one of the at least one second wireless network, play back second audio content received via the one of the at least one second wireless network from at least one remote server.

* * * * *